(12) United States Patent
Paulsen et al.

(10) Patent No.: US 11,347,809 B2
(45) Date of Patent: *May 31, 2022

(54) PERFORMING ATTRIBUTION MODELING FOR ARBITRARY ANALYTICS PARAMETERS

(71) Applicant: Adobe Inc., San Jose, CA (US)

(72) Inventors: Trevor Paulsen, Lehi, UT (US); Ivan Andrus, Saratoga Springs, UT (US); Nathan Purser, Highland, UT (US)

(73) Assignee: Adobe Inc., San Jose, CA (US)

(*) Notice: Subject to any disclaimer, the term of this patent is extended or adjusted under 35 U.S.C. 154(b) by 601 days.

This patent is subject to a terminal disclaimer.

(21) Appl. No.: 16/189,784

(22) Filed: Nov. 13, 2018

(65) Prior Publication Data

US 2020/0151282 A1    May 14, 2020

(51) Int. Cl.
| | |
|---|---|
| *G06F 16/9038* | (2019.01) |
| *G06Q 30/02* | (2012.01) |
| *G06F 16/35* | (2019.01) |
| *G06F 16/335* | (2019.01) |

(52) U.S. Cl.
CPC ........ *G06F 16/9038* (2019.01); *G06F 16/337* (2019.01); *G06F 16/35* (2019.01); *G06Q 30/0201* (2013.01)

(58) Field of Classification Search
CPC .... G06F 16/9038; G06F 16/337; G06F 16/35; G06Q 30/0201
See application file for complete search history.

(56) References Cited

U.S. PATENT DOCUMENTS

| | | | |
|---|---|---|---|
| 7,212,625 B1 | 5/2007 | McKenna et al. | |
| 9,697,316 B1 * | 7/2017 | Taylor | G06F 11/3006 |
| 10,169,778 B1 | 1/2019 | Collin et al. | |
| 10,332,156 B2 | 6/2019 | Buchalter et al. | |
| 10,599,642 B1 | 3/2020 | Hawes et al. | |
| 10,659,403 B2 | 5/2020 | Smullen et al. | |
| 10,970,338 B2 | 4/2021 | Paulsen et al. | |
| 2002/0116249 A1 | 8/2002 | Ellinger et al. | |
| 2007/0198505 A1 | 8/2007 | Fuller | |

(Continued)

OTHER PUBLICATIONS

U.S. Appl. No. 16/189,739, filed Dec. 14, 2020, Notice of Allowance.

(Continued)

*Primary Examiner* — William B Partridge
*Assistant Examiner* — Lahcen Ennaji
(74) *Attorney, Agent, or Firm* — Keller Preece PLLC

(57) ABSTRACT

The present disclosure relates to performing attribution modeling in real time using touchpoint data that correspond to arbitrary analytics parameters (e.g., a user-specified dimension) and are retrieved from a database using an attribution model. For example, in one or more embodiments, a system stores raw data in an analytics database that comprises an aggregator and a plurality of nodes. In particular, each node stores touchpoint data associated with a different user. Upon receiving a query, the system can, in real time, retrieve subsets of the touchpoint data that correspond to a user-specified dimension in accordance with an attribution model. The system then combines the subsets of touchpoint data using the aggregator and generates the digital attribution report using the combined data.

20 Claims, 14 Drawing Sheets

(56) References Cited

U.S. PATENT DOCUMENTS

| | | | |
|---|---|---|---|
| 2008/0288889 A1* | 11/2008 | Hunt | G06Q 30/02 715/810 |
| 2010/0131441 A1* | 5/2010 | Gruenhagen | G06F 16/9535 706/45 |
| 2010/0217650 A1 | 8/2010 | Hartnell | |
| 2011/0302025 A1* | 12/2011 | Hsiao | G06Q 30/0283 705/14.42 |
| 2011/0320715 A1 | 12/2011 | Ickman et al. | |
| 2012/0046996 A1* | 2/2012 | Shah | G06Q 30/0246 705/7.33 |
| 2012/0226527 A1 | 9/2012 | Carwile, Jr. et al. | |
| 2012/0303447 A1 | 11/2012 | Hughes et al. | |
| 2013/0035975 A1 | 2/2013 | Cavander et al. | |
| 2013/0111350 A1 | 5/2013 | Ishii | |
| 2013/0301820 A1 | 11/2013 | Williams et al. | |
| 2014/0195339 A1 | 7/2014 | Paulsen et al. | |
| 2014/0244345 A1 | 8/2014 | Sollis et al. | |
| 2014/0279057 A1 | 9/2014 | Shepherd et al. | |
| 2015/0032725 A1 | 1/2015 | Barykin et al. | |
| 2015/0046828 A1 | 2/2015 | Desai et al. | |
| 2015/0161652 A1 | 6/2015 | Schnabl et al. | |
| 2016/0042388 A1* | 2/2016 | Chater | G06Q 30/0246 705/14.45 |
| 2016/0063427 A1 | 3/2016 | Xu et al. | |
| 2016/0098735 A1* | 4/2016 | Sinha | G06Q 30/0202 705/7.31 |
| 2016/0189207 A1 | 6/2016 | Xu et al. | |
| 2016/0283969 A1 | 9/2016 | Chalimadugu et al. | |
| 2017/0017971 A1 | 1/2017 | Moreau et al. | |
| 2017/0039577 A1 | 2/2017 | Gauthier et al. | |
| 2017/0046734 A1 | 2/2017 | Chittilappilly et al. | |
| 2017/0169092 A1 | 6/2017 | Baird et al. | |
| 2017/0180284 A1 | 6/2017 | Smullen et al. | |
| 2017/0213237 A1* | 7/2017 | Yadagiri | G06Q 10/067 |
| 2017/0323330 A1 | 11/2017 | Chittilappilly et al. | |
| 2017/0337588 A1 | 11/2017 | Chittilappilly et al. | |
| 2018/0096417 A1 | 4/2018 | Cook et al. | |
| 2018/0308123 A1 | 10/2018 | Zhong et al. | |
| 2018/0336639 A1 | 11/2018 | Dziabiak et al. | |
| 2018/0336640 A1 | 11/2018 | Dziabiak et al. | |
| 2019/0130040 A1 | 5/2019 | Ma et al. | |
| 2019/0278378 A1 | 9/2019 | Yan et al. | |
| 2020/0082442 A1* | 3/2020 | Sotomayor | G06Q 30/0267 |
| 2020/0117740 A1 | 4/2020 | Schmidt et al. | |

OTHER PUBLICATIONS

U.S. Appl. No. 16/166,806, filed Dec. 16, 2020, Office Action.
U.S. Appl. No. 16/189,812, filed Jan. 8, 2021, Office Action.
U.S. Appl. No. 16/189,739, filed Aug. 6, 2020, Office Action.
U.S. Appl. No. 16/167,143, filed May 26, 2021, Preinterview 1st Office Action.
U.S. Appl. No. 16/166,806, filed Apr. 5, 2021, Office Action.
U.S. Appl. No. 16/167,143, filed Jul. 14, 2021, 1st Action Office Action.
U.S. Appl. No. 16/166,806, filed Jul. 14 ,2021, Notice of Allowance.
U.S. Appl. No. 16/189,812, filed Jul. 1, 2021, Office Action.
U.S. Appl. No. 16/167,143, filed Oct. 29, 2021, Office Action.
U.S. Appl. No. 16/189,812, filed Sep. 28, 2021, Office Action.
U.S. Appl. No. 16/167,143, filed Jan. 27, 2022, Notice of Allowance.

* cited by examiner

PERFORMING ATTRIBUTION MODELING FOR ARBITRARY ANALYTICS PARAMETERS

BACKGROUND

Advancements in software and hardware platforms have provided a variety of improvements in systems that enable digital content providers to manage campaigns for generating, providing, and distributing digital content across client devices. For example, attribution systems can analyze the effect of a campaign on the occurrence of a particular event (e.g., how the campaign influenced consumers to purchase a product). In particular, an attribution system can apply an attribution model to data representing consumer interactions with the digital content of a campaign (i.e., touchpoint data) and determine a percentage of event occurrences that can be attributed to different elements of the campaign, such as different distribution channels (e.g., emails or banner advertisements distributed to client devices of the consumers or a website hosted or managed by the digital content provider).

Despite these advantages, conventional attribution systems have several technological shortcomings that result in inflexible and inefficient operation. For example, conventional attribution systems are often inflexible in that they rigidly collect data for preset attribution models and a curated set of distribution channels. In particular, many conventional systems preconfigure a database to store touchpoint data corresponding to an attribution model previously selected by an administrator. To illustrate, a conventional system may configure a database to store consumers' interactions with digital content distributed through one or more distribution channels. However, the system would be unable to model touchpoint data corresponding to any other parameters as such data would not have been pre-collected or pre-analyzed. Thus, conventional attribution systems do not offer flexibility.

In addition to flexibility concerns, conventional attribution systems are also inefficient. For example, conventional systems typically struggle to efficiently adapt to changing administrator requests. In particular, because conventional systems are often unable to perform on demand attribution analysis unless the database has been preconfigured to collect such data, such systems often must reconfigure the database to accommodate any new or different request. Consequently, the conventional systems often require additional computing resources (e.g., processing time and power) in order to reconfigure the database.

Furthermore, performing an attribution analysis for a website or native application can involve the processing of billions of pieces of data. Additionally, conventional systems often store such data in a distributed architecture and/or in non-relational databases. Due to the amount of data and such architectures, the amount of time to run a query-time attribution analysis can be substantial and prohibitive due to the need of database node cross-talk and other time-consuming data retrieval processes. As such, the time required to perform query-time attributing modeling using conventional system make such modeling unfeasible.

These, along with additional problems and issues, exist with regard to conventional attribution systems.

SUMMARY

One or more embodiments described herein provide benefits and/or solve one or more of the foregoing or other problems in the art with systems, methods, and non-transitory computer readable storage media that perform attribution modeling in real time at the time of a request using a backend analytics system designed to allow for flexible, query-time attribution modeling of arbitrary analytics parameters. For example, in one or more embodiments, the system stores raw, unprocessed analytics data in a database that comprises an aggregator and a plurality of nodes. In particular, each node stores all touchpoint data associated with a given user (e.g., consumer). Upon receiving a query, the system can process data from each node on the fly in order to generate digital attribution reports for any of a plurality of analytics parameters rather than just pre-cured distribution channels. Specifically, the system can retrieve subsets of touchpoint data from the nodes that correspond to a user-specified parameter and uses the aggregator to combine the subsets. The system then generates a digital attribution report based on the combined data. In this manner, the disclosed systems can flexibly and efficiently apply attribution models to arbitrary analytics parameters specified by an administrator at query time.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
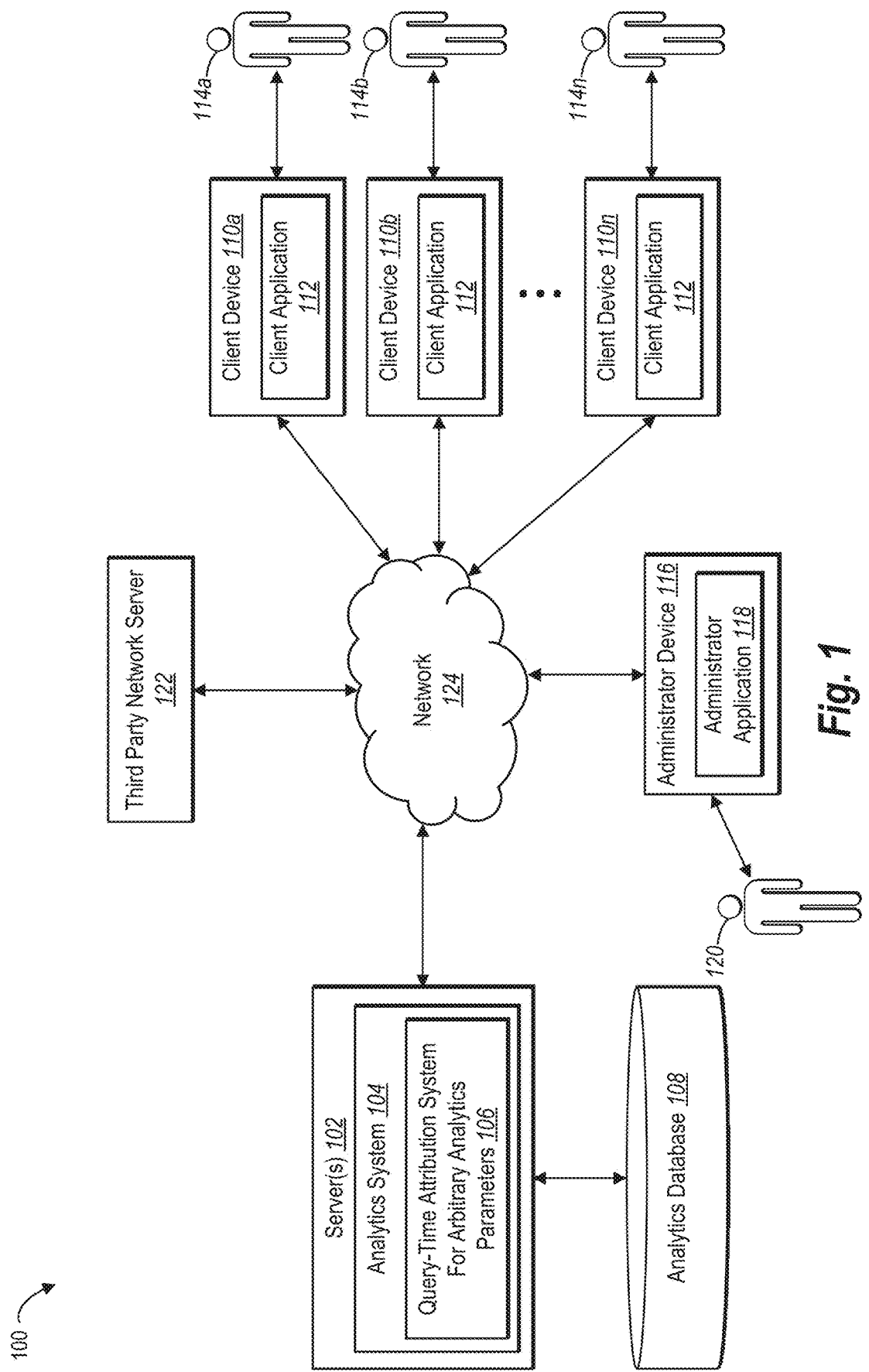
FIG. 1 illustrates an example environment in which a query-time attribution system can operate in accordance with one or more embodiments.

One or more embodiments described herein include a query-time attribution system that performs query-time attribution modeling for arbitrary analytics parameters using a database structured to allow for flexibility and speed. For instance, the query-time attribution system can store raw, unprocessed data in a plurality of nodes of an analytics database where each node corresponds to a different user (i.e., stores raw touchpoint data associated with that user). The query-time attribution system can subsequently apply attribution logic to the stored data at query time to perform complex, on-demand attribution modeling. For example, upon receiving a query for a digital attribution report, the query-time attribution system can, in real time, retrieve subsets of touchpoint data that correspond to one or more user-specified analytics parameters (e.g., a user-specified dimension or event) in accordance with an applicable attribution model. The query-time attribution system can then combine the subsets of touchpoint data using an aggregator of the analytics database and generate the digital attribution report based on the combined data.

More specifically, the query-time attribution system allow for on-demand attribution modeling of arbitrary analytics parameters (e.g., parameters not specified prior to query time and not limited to top level marketing or distribution parameters). In other words, the query-time attribution system can perform on-the-fly attribution analyses of any analytics parameter rather than just distribution parameters. Thus, the query-time attribution system can apply sophisticated attribution modeling to data above and beyond marketing or distribution channel use cases. For example, the query-time attribution system can apply sophisticated attribution modeling to relative to internal promotions, coupons, discount codes, search keywords, email campaigns, page types, promotional videos, individual marketing tracking codes, campaigns, or other dimensions. Furthermore, the query-time attribution system can apply sophisticated attribution modeling to any event, thereby allowing an end user to apply sophisticated attribution to things beyond orders or revenue like custom events, units, cart additions or removals, etc.

To provide an example, in one or more embodiments, the query-time attribution system stores touchpoint data in an analytics database that comprises an aggregator and a plurality of nodes. In particular, each node stores touchpoint data associated with a different user. The system can then receive a query including a user-specified dimension. In response to receiving the query, and in real time, the system can retrieve, from one or more of the nodes, a subset of the touchpoint data that corresponds to the user-specified dimension using an attribution model. The system can then combine the retrieved data using the aggregator, generate a digital attribution report based on the combined data, and provide the digital attribution report for display on a client device. In one or more embodiments, the query can also include a user-specified attribution model and/or a user-specified event upon which to base the attribution.

As just mentioned, in one or more embodiments, the query-time attribution system stores touchpoint data in an analytics database that comprises a plurality of nodes. In particular, each node can correspond to a separate user and the query-time attribution system can store all touchpoint data associated with that user in the corresponding node. In one or more embodiments, each instance of touchpoint data includes a timestamp and the query-time attribution system stores the touchpoint data in each node chronologically based on the time stamp. The query-time attribution system can further retrieve subsets of touchpoint data from the nodes in response to a query to generate a digital attribution report. For example, in one or more embodiments, each node includes a processing unit that, in response to a query, can filter out touchpoint data that does not correspond to a user-specified dimension and analyze the remaining data in accordance with an applicable attribution model.

The analytics database further includes one or more aggregators. After retrieving the subsets of touchpoint data from the plurality of nodes, the query-time attribution system can use the aggregator to combine the subsets of touchpoint data. The query-time attribution system can utilize the combined subsets of touchpoint data to generate a digital attribution report.

In one or more embodiments, the analytics database further comprises a plurality of intermediate aggregators. In particular, each intermediate aggregator can correspond to a subset of nodes and can combine the subsets of touchpoint data retrieved from its corresponding subset of nodes to generate a set of aggregated touchpoint data. Subsequently, the query-time attribution system can use the aggregator (i.e., a master aggregator) to further combine the sets of aggregated touchpoint data from the plurality of intermediate aggregators.

Additionally, as mentioned above, the query-time attribution system can generate digital attribution reports for arbitrary dimensions specified by an administrator. In particular, the query-time attribution system can generate digital attribution reports for dimensions other than the "distribution channel" dimension. For example, the query-time attribution system can provide, to a client device of an administrator, a user interface that provides selectable options indicating one or more dimensions. The administrator can select one or more of the dimensions to submit as part of a query. In response, the query-time attribution system can retrieve, from the nodes of the analytics database, subsets of touchpoint data that correspond to the user-specified dimensions and combine the touchpoint data that corresponds to the same dimension value. To illustrate, the query-time attribution system can retrieve subsets of touchpoint data that correspond to user interactions with different webpages associated with the administrator in response to receiving a query that includes the "page" dimension. The query-time attribution system can then use the aggregator to combine touchpoint data, from the subsets, that correspond to the same webpage and generate a digital attribution report based on the combined data.

Similarly, the query-time attribution system can generate digital attribution reports based on user-specified events. In particular, the query-time attribution system can generate digital attribution reports based on events other than orders and/or revenue. For example, an administrator can use the user interface provided by the query-time attribution system to select an event to submit as part of a query and, in response, the query-time attribution system can retrieve the subsets of touchpoint data based on the event.

Further, as mentioned above, the query-time attribution system operates to generate digital attribution reports in real time in response to receiving a query. In particular, in one or more embodiments, the query-time attribution system defers processing the touchpoint data stored in the analytics database until after receiving a query from an administrator. Consequently, the query-time attribution system can utilize the analytics parameters included within the query (e.g., a user-specified dimension) when generating the digital attribution report.

The query-time attribution system provides several advantages over conventional systems. For example, the query-time attribution system improves the flexibility with which digital attribution reports are generated. In particular, the query-time attribution system stores touchpoint data without regard to any particular dimension or event. Consequently, the query-time attribution system can generate digital attribution reports for any dimension or any event identified at query time. For example, the query-time attribution system can store every touchpoint (i.e., interaction) experienced by a user corresponding to any dimension and leading up to any event. Having the raw data allows the query-time attribution system, at query time, to perform on-demand attribution analysis for any dimension or event. Additionally, by allowing the administrator to specify the dimensions and/or events when submitting the query, the query-time attribution system can flexibly accommodate deeper analysis or fast and responsive evaluation.

Further, the query-time attribution system improves efficiency. In particular, by storing touchpoint data without regard to any particular dimension or event and deferring the processing of the touchpoint data until a query has been received, the query-time attribution system avoids a need to pre-configure or reconfigure the analytics database to accommodate queries specifying new analytics parameters. Consequently, the query-time attribution system improves the efficiency of implementing computer systems by requiring less processing power and time during operation.

In addition to the foregoing, the structure of the backend (e.g., database) of the query-time attribution system allows for increased speed. In contrast to conventional systems, the structure of the backend (e.g., database) of the query-time attribution system allows for fast and efficient query-time attribution modeling. In particular, by storing touchpoint data for a single (or a limited number) of users in each node, the query-time attribution system eliminates the need for node cross-talk and ensures that each node can essentially instantaneously (e.g., in milliseconds) retrieve and forward to an aggregator the data applicable to an attribution query. The aggregator can then combine the applicable data so as to build an attribution report. Thus, despite having to processes large amounts of data, the structure of the query-time attribution system allows for fast and flexible query-time attribution modeling.

As illustrated by the foregoing discussion, the present disclosure utilizes a variety of terms describing features and benefits of the query-time attribution system. Additional detail is now provided regarding the meaning of these terms. For example, as used herein, a "dimension" refers to a set, category, or classification of values for organizing or attributing underlying data (e.g., a set of values for analyzing, grouping, or comparing event data). In some embodiments, a dimension refers to non-numeric characteristics (e.g., characteristics of one or more digital content campaigns) that correlate, relate, or classify events. Dimensions include, but are not limited to, distribution channels, internal campaigns, product finding methods, internal search terms, pages, page types, products, product types, or product brands. Relatedly, a "dimension value" refers to a particular item, value, or component in a dimension. For example, a dimension value can be a particular distribution channel, internal campaign, product finding method, internal search term, page, page type, product, product type, or product brand.

As a particular example of a dimension, a "distribution channel" can refer to a medium, channel, outlet, or method by which a user can access or receive information. For example, a distribution channel can include a medium by which a user purchases a product or observes a video related to a service. Distribution channels include, but are not necessarily limited to, email, referring domains (e.g., web sites that include a link to a webpage of the administrator), display (e.g., banner advertisements), social media, organic search (e.g., where a search engine ranks a website of the administrator without the administrator paying for the listing), paid search, or direct access (e.g., directly accessing a website).

As used herein, the term "touchpoint" refers to an interaction between two entities that can be tracked and stored. In particular, a touchpoint refers to an exposure of a user to digital content associated with an administrator (e.g., a digital content provider or representative of a digital content provider). For example, a touchpoint can refer to receiving an email, viewing an advertisement associated with the administrator, visiting a webpage or social network page managed by the administrator, performing a search within a web site of the administrator, or viewing a particular product or product type associated with the administrator (e.g., offered for sale by the administrator).

Further, as used herein, the term "touchpoint data" refers to digital data representing touchpoints. In particular, when a user is exposed to digital content associated with an administrator, the query-time attribution system can store, into an analytics database accessible or available to that administrator, touchpoint data corresponding to the particular touchpoint. For example, an instance of touchpoint data can include an indication of a touchpoint and a timestamp associated with the touchpoint indicating when the touchpoint occurred.

Further, as used herein, the term "event" refers to a quantifiable action performed by a user or a quantifiable result of an action by a user. In some cases, an event includes a discrete quantifiable action (or result of an action) taken by a visitor on a network platform, such as in a software application or on a website. For example, an event can include, but is not limited to, an application download, an application use, a click, a click-through, a conversion, an order, a purchase, a webpage view, a web search, an instance of a quantity of time spent on a given webpage, a first time visit, a visitor from a search engine or a social networking site, a transaction resulting in a quantity of revenue, or a quantity of revenue over a certain amount.

Additionally, as used herein, the term "attribution" refers to a measure of causation, credit, contribution, responsibility, or influence (in whole or in part) between a factor or variable and a result. In particular, attribution can include an assignment of credit or influence to a dimension value for an event. For instance, attribution can refer to determining that digital content distributed through email are responsible for a particular percentage of overall purchases of a given product (i.e., the dimension value of email is wholly or partially responsible for particular purchase events).

Further, as used herein, the term "digital attribution report" refers to a digital description of an attribution. In particular, a digital attribution report provides attribution results that provide a description of the credit or influence assigned to one or more dimension values for an event resulting from the application of an attribution model (i.e., an attribution distribution). As an example, a digital attribution report can provide a description of the credit or influence assigned to each distribution channel from a plurality of distribution channels. A digital attribution report can provide the attribution results using a textual description, a visual description (e.g., charts and graphs), or an audio description.

Additionally, as used herein, the term "attribution model" as used herein refers to a computer-based algorithm or rule set that determines an attribution or attribution distribution. In particular, an attribution model includes a computer-implemented algorithm that determines a measure of causation, credit, contribution, influence, or responsibility between a factor (e.g., a dimension value) and a result (e.g., an event), where multiple factors may contribute to the result. In some embodiments, an attribution model employs machine learning or statistical models to determine weights (e.g., using a regression analysis). In other embodiments, an attribution model is rule-based by using predetermined weights based on rules. The query-time attribution system can train an attribution model based on observations that incorporate a discrete-time survival model, which is a type of time-to-event model. In addition, the query-time attribution system can create a supervised learning model (e.g., via machine learning).

Attribution models include, for example, a first touch model, a last touch model, a linear model, a participation model, a same touch model, a U-shaped model, J curve model, an inverse J model, a time decay model, and a custom model. A first touch attribution model assigns all the credit of success to a first dimension value with which a user engages. A last touch model assigns all credit to the last dimension value with which a user engages. A linear model applies equal weight to all dimension values. A participation model assigns equal credit to every unique dimension value. A same touch model assigns all credit to the dimension value where a result (e.g., conversion) occurs. A U-shaped model assigns particular percentages of credit to dimension values of two key touchpoints—the first touch and the last touch—as well as those values of any touchpoints in between the two. A J curve model assigns particular percentages of credit to the values of the first and last touchpoints (e.g., 20% to the first and 60% to the last) and spreads the remaining percentage across any dimension values of additional touchpoints. An inverse J model is the inverse of the J curve model where, for example, 60% of the credit is assigned to the dimension value of the first touchpoint and 20% is assigned to the last. A time decay model assigns credit according to the length of time between touchpoints or between a touchpoint and a result (e.g., a conversion), where dimension values of more recent touchpoints are weighted heavier than those of older touchpoints which may not have been as impactful on a given result. A custom model attributes credit according to user-defined parameters or settings. Indeed, the query-time attribution system can receive user input within a user interface to define a custom attribution model.

Additional detail regarding the query-time attribution system will now be provided with reference to the figures. For example, FIG. 1 illustrates a schematic diagram of an example environment 100 in which a query-time attribution system for arbitrary analytics parameters 106 (hereinafter query-time attribution system 106) operates. As illustrated in FIG. 1, the environment 100 can include a server(s) 102, an analytics database 108, client devices 110a-110n associated with users 114a-114n, an administrator device 116 associated with an administrator 120, a third-party network server(s) 122, and a network 124.

Although the environment 100 of FIG. 1 is depicted as having a particular number of components, the environment 100 can have any number of additional or alternative components (e.g., any number of servers, client devices, administrator devices, databases, or other components in communication with the query-time attribution system 106 via the network 124). Similarly, although FIG. 1 illustrates a particular arrangement of the server(s) 102, the analytics database 108, the client devices 110a-110n, the users 114a-114n, the administrator device 116, the administrator 120, the third-party network server(s) 122, and the network 124, various additional arrangements are possible.

The server(s) 102, the analytics database 108, the client devices 110a-110n, the administrator device 116, the third-party network server(s) 122, and the network 124 may be communicatively coupled with each other either directly or indirectly (e.g., through the network 124, networks are discussed with greater detail below in relation to FIG. 12). Moreover, the server(s) 102, the client devices 110a-110n, the administrator device 116, and the third-party network server(s) 122 may include a computing device (including one or more computing devices as discussed in greater detail below in relation to FIG. 12).

As mentioned above, the environment 100 includes the server(s) 102. The server(s) 102 can generate, store, receive, and/or transmit data, including data regarding touchpoints, events, or digital attribution reports. For example, the server(s) 102 may receive touchpoint data from the client device 110a (e.g., via the third-party network server 122) and transmit a digital attribution report to the administrator device 116. In one or more embodiments, the server(s) 102 comprises a data server. The server(s) 102 can also comprise a communication server or a web-hosting server.

As shown in FIG. 1, the server(s) 102 can include an analytics system 104. In particular, the analytics system 104 can collect touchpoint data. For example, the analytics system 104 can collect touchpoint data associated with a particular user. The analytics system 104 can collect the touchpoint data in a variety of ways. For example, in one or more embodiments, the analytics system 104 causes the server(s) 102 and/or the third-party network server(s) 122 to track users' touchpoint data and report the tracked touchpoint data for storage on the analytics database 108. To illustrate, the third-party network server(s) 122 can include an email server that distributes emails from an administrator, tracks the emails to determine that they were properly received, and reports touchpoint data corresponding to each recipient that properly received the email to the analytics system 104. In one or more embodiments, the analytics system 104 receives user data directly from the client devices 110a-110n (e.g., browser cookies, cached memory), embedded computer code (e.g., tracking pixels), a user profile, or using various types of tracking techniques. Thus, the analytics system 104 collects or otherwise receives various types of data, including data regarding interactions of the users 116a-116n with web sites, emails, native mobile device software applications, etc.

Additionally, the server(s) 102 can include the query-time attribution system 106. In particular, in one or more embodiments, the query-time attribution system 106 uses the server(s) 102 to store touchpoint data and generate digital attribution reports. For example, the query-time attribution system 106 can cause the server(s) 102 to receive a query and then generate a digital attribution report using stored touchpoint data in response to the query.

For example, in one or more embodiments, the server(s) 102 can store touchpoint data in the analytics database 108. The server(s) 102 can then receive a query to generate a digital attribution report for a user-specified dimension based on an attribution model. In response to the query, and in real time, the server(s) 102 can use the analytics database 108 to retrieve subsets of touchpoint data corresponding to the user-specified dimension in accordance with the attribution model and combine the subsets of touchpoint data. The server(s) 102 can then generate a digital attribution report based on the combined data and provide the report to a client device (e.g., the administrator device 116).

As illustrated by the previous example embodiments, the query-time attribution system 106 can be implemented in whole, or in part, by the individual elements of the environment 100. Although FIG. 1 illustrates the query-time attribution system 106 implemented with regards to the server(s) 102, it will be appreciated that one or more components of the query-time attribution system 106 can be implemented in other components of the environment 100, such as for example, the administrator device 116. The components of the query-time attribution 106 will be discussed in more detail with regard to FIG. 10 below.

In one or more embodiments, the analytics database 108 stores all touchpoint data relevant to generating digital attribution reports. For example, the analytics database 108 can store touchpoint data, event data, user data, or device data. The analytics database 108 will be discussed in more detail below with reference to FIGS. 8-9. Though FIG. 1 illustrates the analytics database 108 as a separate component to the analytics system 104, one or more embodiments include the analytics database 108 as a component of the server(s) 102 or the analytics system 104.

In one or more embodiments, the client devices 110a-110n include computer devices that allow users of the devices (e.g., the users 114a-114n) to be exposed to digital content associated with an administrator. For example, the client devices 110a-110n can include smartphones, tablets, desktop computers, laptop computers, or other electronic devices. The client devices 110a-110n can include one or more applications (e.g., the client application 112) that allow the users 114a-114n to be exposed to digital content associated with the administrator. For example, the client application 112 can include a software application installed on the client devices 110a-110n. Additionally, or alternatively, the client application 112 can include a software application hosted on the server(s) 102, which may be accessed by the client devices 110a-110n through another application, such as a web browser.

In one or more embodiments, the administrator device 116 includes a computer device that allows a user of the device (e.g., the administrator 120) to submit a query for and receive digital attribution reports. For example, the administrator device 116 can include a smartphone, tablet, desktop computer, laptop computer, or other electronic device. The administrator device 116 can include one or more applications (e.g., the administrator application 118) that allows the administrator 120 to submit a query for and receive digital attribution reports. For example, the administrator application 118 can include a software application installed on the administrator device 116. Additionally, or alternatively, the administrator application 118 can include a software application hosted on the server(s) 102, which may be accessed by the administrator device 116 through another application, such as a web browser.

Figure 2:
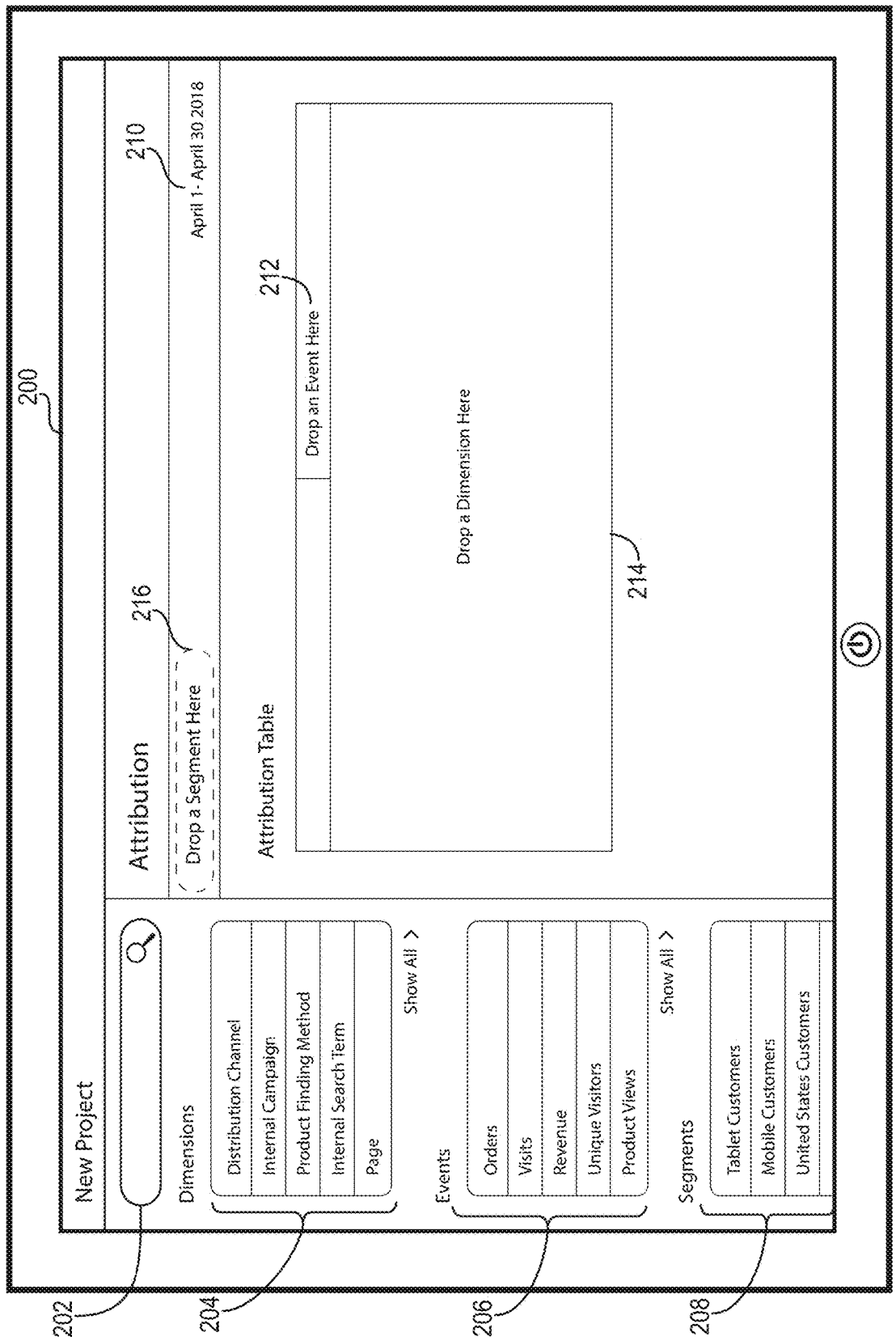
FIG. 2 illustrates a user interface provided by the query-time attribution system for submitting a query to generate a digital attribution report in accordance with one or more embodiments.

In one or more embodiments, the query-time attribution system 106 provides a user interface for receiving queries to generate digital attribution reports. FIG. 2 illustrates a user interface 200 that the query-time attribution system 106 provides for display on a client device (e.g., the administrator device 116) in accordance with one or more embodiments. In particular, the user interface 200 provides a plurality of options that an administrator can select in submitting a query for a digital attribution report. As illustrated in FIG. 2, the user interface 200 includes a search bar 202, dimension options 204, event options 206, segment options 208, date window 210, an event drop target 212, a dimension drop target 214, and a segment drop target 216.

As mentioned above, the user interface 200 includes the dimension options 204. As shown in FIG. 2, the dimension options 204 can include dimensions other than (i.e., in addition to) distribution channels. In particular, the query-time attribution system 106 provides the dimension options 204 to enable an administrator to select one or more dimensions to include in a query. In response, the query-time attribution system 106 can generate a digital attribution report using touchpoint data that corresponds to the selected dimensions. In one or more embodiments, the query-time attribution system 106 provides dimensions in addition to those shown. In some embodiments, the user interface 200 provides a selectable option whereby the administrator can view and select the additional dimensions. In further embodiments, the query-time attribution system 106 can search for additional dimensions based on input provided by the administrator in the search bar 202.

Additionally, the user interface 200 includes the event options 206. As shown in FIG. 2, the event options 206 can include events other than (i.e., in addition to) orders and revenue. In particular, the event options 206 enable the administrator to select an event to include in a query. Consequently, the query-time attribution system 106 generates a digital attribution report showing how the applied attribution model credits particular dimension values (i.e., dimension values of the selected dimensions) with the occurrence of the selected event. In one or more embodiments, the query-time attribution system 106 provides events in addition to those shown. In some embodiments, the user interface 200 provides a selectable option whereby the administrator can view and select the additional events. In further embodiments, the query-time attribution system 106 can search for additional events based on input provided by the administrator in the search bar 202.

Further, as shown in FIG. 2, the user interface 200 includes segment options 208. In particular, the segment options 208 enable the administrator to select a segment to be applied to a query. Consequently, the query-time attribution system 106 generates the digital attribution report using only touchpoint data associated with the selected segment. For example, the query-time attribution system 106 can generate a digital attribution report using only touchpoint data corresponding to users who were exposed to digital content through a mobile device in response to the administrator selecting a "mobile customers" segment. In one or more embodiments, the query-time attribution system 106 provides segments in addition to those shown. In some embodiments, the user interface 200 provides a selectable option whereby the administrator can view and select the additional segments. In further embodiments, the query-time attribution system 106 can search for the additional segments based on input provided by the administrator in the search bar 202.

As shown in FIG. 2, the user interface 200 further includes the date window 210. In particular, the date window 210 provides time limits on the touchpoint data used when generating digital attribution reports. For example, in response to an administrator setting the date window 210 from Apr. 1-Apr. 30, 2018 as shown in FIG. 2, the query-time attribution system 106 can limit the touchpoint data used in generating digital attribution reports to touchpoint data that is relevant to those dates (i.e., falling within those dates or corresponding to an event that falls within those dates). The query-time attribution system 106 can determine whether an instance of touchpoint data falls within the established date range included within the date window 210 by comparing the date range with a timestamp of the instance of touchpoint data. In one or more embodiments, the administrator can modify the applicable date range by selecting (e.g., clicking) the date window 210 and selecting a new date range. In some embodiments, the administrator can modify the date range included in the date window 210 after a digital attribution report has been generated, and the query-time attribution system 106 can generate a new digital attribution report using the modified date range (i.e., modification of the date range submits a new query to generate a new digital attribution report).

As illustrated in FIG. 2, the user interface 200 further includes the event drop target 212. In one or more embodiments, the query-time attribution system 106 includes an event in a query to generate a digital attribution report in response to detecting a selection of an event from the event options 206 (or from a list resulting from a search using the search bar 202) and optionally detecting a dragging of the selected event to the event drop target 212 by an administrator.

Similarly, in one or more embodiments, the user interface 200 includes a dimension in a query to generate a digital attribution report in response to detecting a selection of a dimension from the dimension options 204 (or from a list resulting from a search using the search bar 202) and optionally detecting a dragging of the selected dimension to the dimension drop target 214 by an administrator.

Likewise, in one or more embodiments, the user interface 200 includes a segment in a query to generate a digital attribution report in response to detecting a selection of a segment from the segment options 208 (or from a list resulting from a search using the search bar 202) and optionally detecting a dragging of the segment to the segment drop target 216.

In one or more embodiments, the query-time attribution system 106 receives a query to generate a digital attribution report by receiving a user-specified dimension. The query can also include an attribution model that is either a default attribution model or a user-specified attribution model. Including a user-specified attribution model as part of a query in response to a selection by an administrator will be discussed in more detail below with reference to FIGS. 5-6C. In some embodiments, the query can further include a user-specified event. Though discussion with reference to FIGS. 3-4 discusses use of a default attribution model in generating digital attribution reports, it should be noted that the query-time attribution system 106 can include a default setting for any of the analytics parameters (i.e., dimension, event, or attribution model) and enable an administrator to modify any of the analytics parameters via selection.

Figure 3:
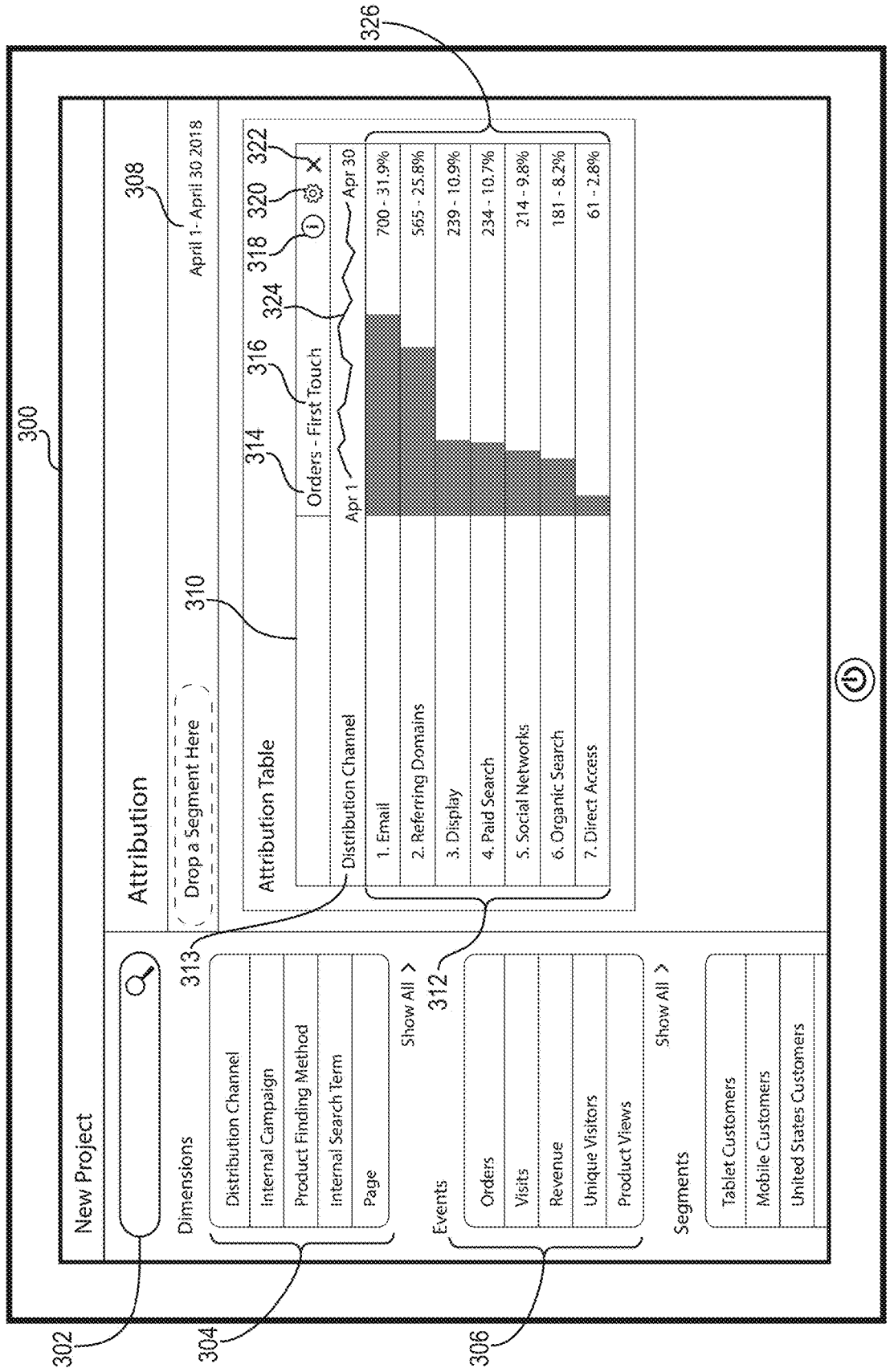
FIGS. 3-4 each illustrate a user interface displaying a digital attribution report in accordance with one or more embodiments.

FIG. 3 illustrates a user interface 300 provided by the query-time attribution system 106 after detecting parameters for an attribution query as described above in relation to FIG. 2. In particular, the user interface 300 is similar to the user interface 200 of FIG. 2, except that the user interface 300 provides a digital attribution report 310 generated in response to a query. In particular, the digital attribution report 310 includes a set of dimension value indicators 312 corresponding to a dimension indicator 313, an event indicator 314, an attribution model indicator 316, an information option 318, a settings options 320, a deselect option 322, an event performance graph 324, and an attribution display 326.

The query-time attribution system 106 indicates dimension values using the set of dimension value indicators 312. In particular, the dimension values correspond to a dimension selected by an administrator from the dimension options 304 (or from a list resulting from a search using the search bar 302) as indicated by the dimension indicator 313. For example, as shown in FIG. 3, the set of dimension value indicators 312 includes a plurality of distribution channels in response to the administrator selecting the "distribution channel" dimension. In particular, the set of dimension value indicators 312 includes indicators for an "email" channel, a "referring domains" channel, a "display" channel, a "paid search" channel, a "social networks" channel, an "organic search" channel, and a "direct access" channel. In one or more embodiments, the query-time attribution system 106 orders the dimension value indicators based on the attribution results provided within the attribution display 326 (e.g., orders the dimension value indicators to place the indicator corresponding to the most credited dimension value at the top and the indicator corresponding to the least credited dimension value at the bottom).

Similarly, the query-time attribution system 106 indicates an event selected by the administrator from the event options 306 (or from a list resulting from a search using the search bar 302) using the event indicator 314. In particular, the query-time attribution system 106 provides the digital attribution report 310 to illustrate the influence of the dimension values corresponding to the set of dimension value indicators 312 on the occurrence of the event indicated by the event indicator 314. For example, as shown in FIG. 3, the event indicator 314 shows that the administrator selected the "orders" event, indicating that the digital attribution report 310 illustrates how the distribution channels named above affected or influenced customer orders.

The query-time attribution system 106 provides the attribution model indicator 316 to indicate the attribution model applied to subsets of touchpoint data corresponding to the dimension indicated by the dimension indicator 313. As shown in FIG. 3, the query-time attribution system 106 initially applies a default attribution model (e.g., a first touch model) to the subsets of touchpoint data. Some embodiments involve detecting a user-specified attribution model before generating a digital attribution report 310 and using the user-specified attribution model as the basis of the attribution report.

The query-time attribution system 106 uses the information option 318 to provide a textual, audio, and/or graphical description of one or more features of the digital attribution report 310. For example, the information option 318 can provide a description of the event indicated by the event indicator 314 (e.g., provide a definition of the event). Additionally, or alternatively, the information option 318 can provide a description of the attribution model indicated by the attribution model indicator 316. The query-time attribution system 106 uses the settings option 320 to provide one or more selectable options, which when selected, cause the query-time attribution system 106 to modify the presentation of the digital attribution report 310 or the attribution model applied as will be discussed in more detail below with regards to FIG. 5-6C. In one or more embodiments, when the query-time attribution system 106 detects a selection of the deselect option 322, the query-time attribution system deselects the event portrayed by the event indicator 314 or the attribution model portrayed by the attribution model indicator 316. In some embodiments, in response to detecting a selection of the deselect option 322, the query-time attribution system 106 deletes or hides the digital attribution report 310 entirely.

To provide a broad look at the occurrence of the event indicated by the event indicator 314 throughout the time period defined by the date window 308, the query-time attribution system 106 provides an event performance graph 324. For example, as shown in FIG. 3, the event performance graph 324 provides a line graph representing how many orders have been received throughout the month of April (e.g., the date range provided in the date window 308). In one or more embodiments, the query-time attribution system 106 can modify the event performance graph 324 to provide a different graphical representation (e.g., a bar graph) of the occurrence of the event in response to input by the administrator.

The attribution display 326, generated by the query-time attribution system 106, includes a graph that provides a graphical representation of the attribution results obtained from application of the attribution model indicated by the attribution model indicator 316. In particular, the attribution display 326 shows the credit assigned to each dimension value portrayed by the set of dimension value indicators 312. For example, as shown in FIG. 3, the attribution display 326 shows the credit assigned to each distribution channel for orders received in the month of April according to a first touch attribution model. To illustrate, the attribution display 326 shows that the first touch model attributed the most credit for orders received in the month of April to the email channel. In some embodiments, the attribution display 326 shows the credit attributed for orders using a different value, such as a dollar amount associated with the credited orders.

Figure 4:
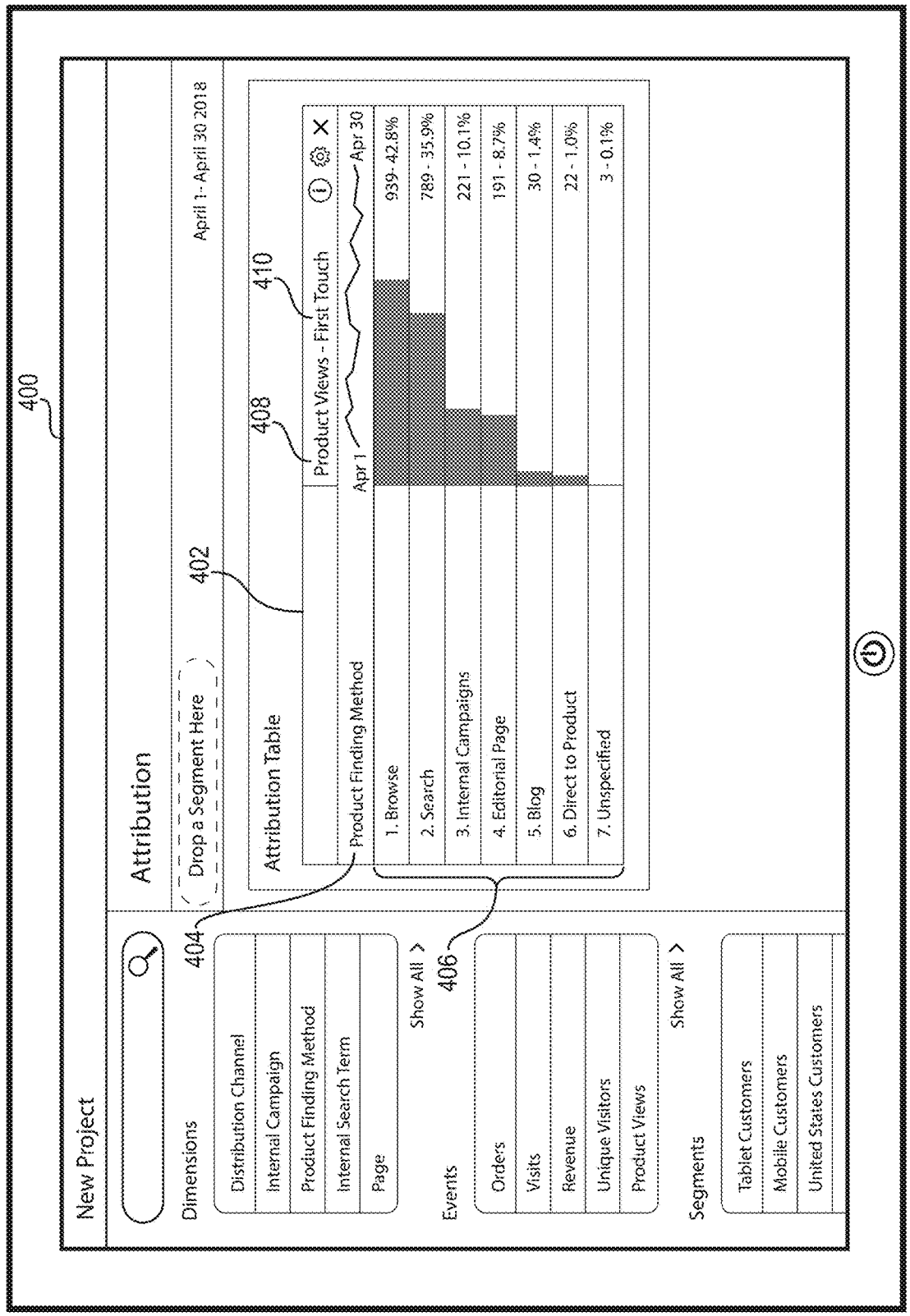

As mentioned above, the query-time attribution system 106 can generate digital attribution reports for any user-specified dimension and/or event. In particular, FIG. 4 illustrates a user interface 400 provided by the query-time attribution system 106 after receiving a query that includes a user-specified dimension other than distribution channels and a user-specified event other than orders (or revenue). In particular, the user interface 400 displays the digital attribution report 402, which includes attribution results for a "product finding method" dimension as indicated by the dimension indicator 404, broken down into its respective dimension values indicated by the dimension value indicators 406.

Further, the event indicator 408 indicates that the query-time attribution system 106 generated the digital attribution report 402 based on the "product views" event. In other words, the digital attribution report 402 illustrates how the product finding methods listed by the dimension value indicators 406 affected customer product views. To illustrate, the digital attribution report 402 shows that a browsing method was the first product finding method used (in accordance with the first touch model indicated by the attribution model indicator 410) by over nine hundred customers before viewing a product.

Figure 5:
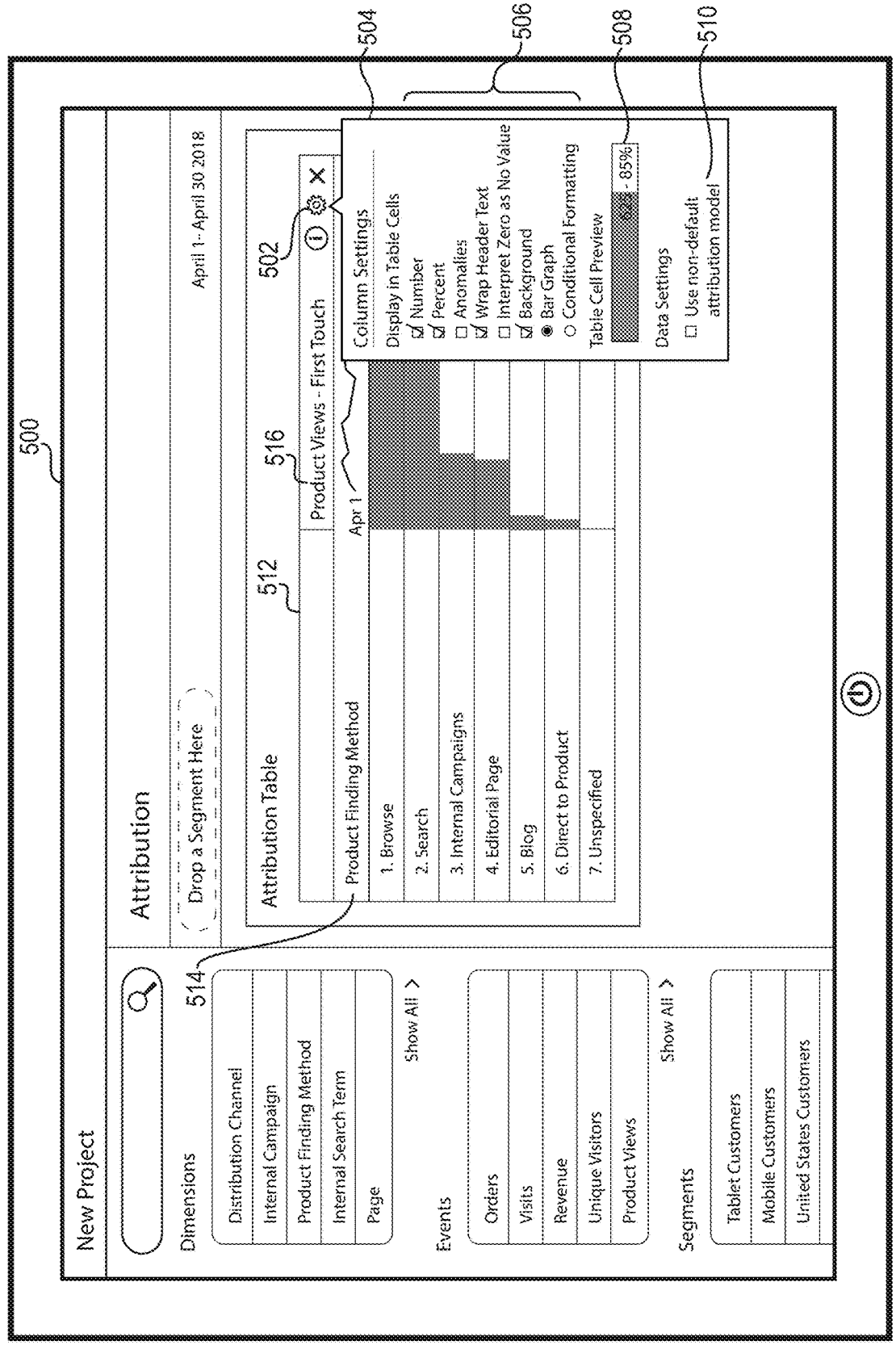
FIG. 5 illustrates a user interface displaying a settings window that provides options for editing a digital attribution report in accordance with one or more embodiments.

As mentioned above, in one or more embodiments, the query-time attribution system 106 can generate a digital attribution report using a user-specified attribution model in response to input provided by the administrator. FIG. 5 illustrates a user interface 500 provided by the query-time attribution system 106 including a settings window 504 providing various options to the administrator, including the option to select an attribution model. In one or more embodiments, the query-time attribution system 106 provides the settings window 504 in response to an administrator selection of the settings option 502.

As illustrated in FIG. 5, the settings window 504 provides a plurality of visualization options 506 by which an administrator can modify the visual presentation provided by the digital attribution report 512. For example, the administrator can select or deselect one or more options that cause the digital attribution report 512 to include or exclude particular data, respectively (e.g., "numbers" or "percent"). Additionally, the settings window 504 can include the table cell preview 508 that provides an example of the visualization that will be provided by the digital attribution report 512 based on the chosen visualization options.

Further, the settings window 504 includes the attribution model option 510. Upon selection of the attribution model option 510, the query-time attribution system 106 enables the administrator to select a user-specified attribution model. Where the administrator has previously submitted a user-specified attribution model, the attribution model option 510 will indicate (i.e., with a checkmark) that a non-default attribution model has already been applied. Consequently, the settings window 504 can further provide a selectable option (not shown) that causes the query-time attribution system 106 to modify or change the currently selected attribution model in response to detecting input by the administrator. In one or more embodiments, in response to detecting a modification to the currently selected attribution model or a submission of a new attribution model (e.g., by selecting a different user-specified attribution model) the query-time attribution system 106 recognizes a new query for which to generate a new digital attribution report. In particular, the new query will include the user-specified attribution model as well as the user-specified dimension indicated by the dimension indicator 514 and the user-specified event indicated by the event indicator 516.

Figure 6A:
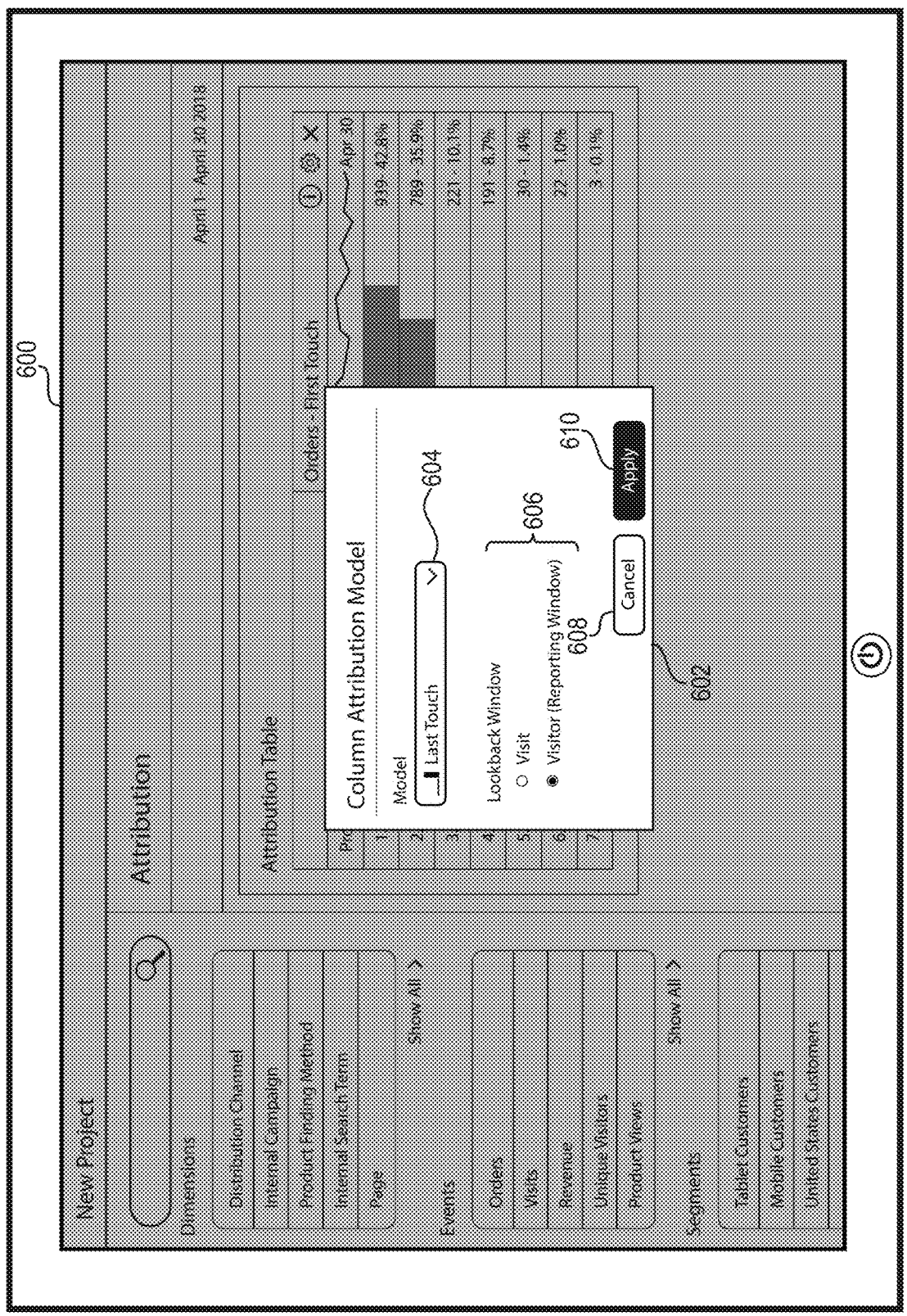
FIGS. 6A-6C illustrate a user interface displaying an attribution model selection window that provides options for selecting, changing, or modifying attribution models in accordance with one or more embodiments.
Figure 6B:
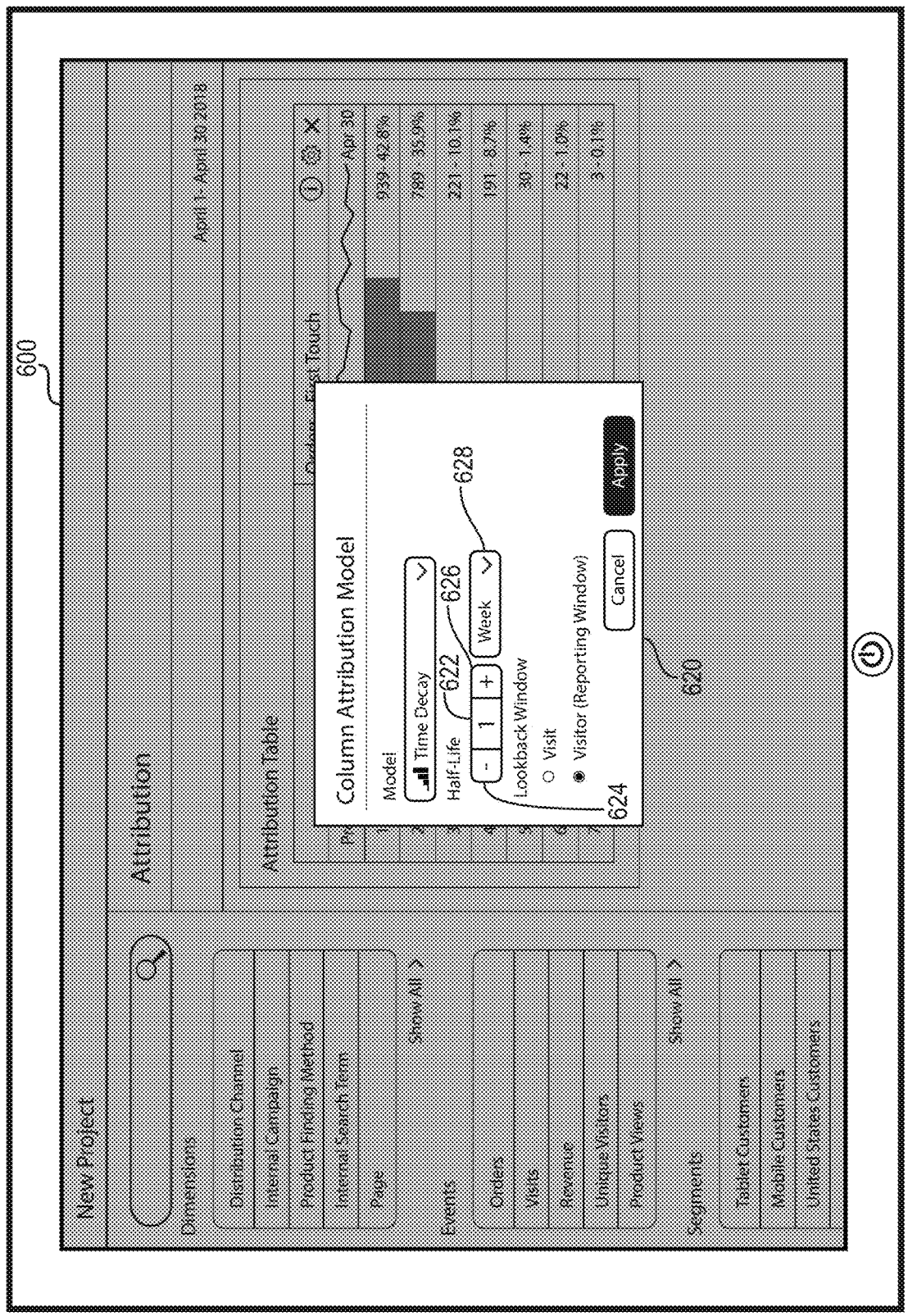
Figure 6C:
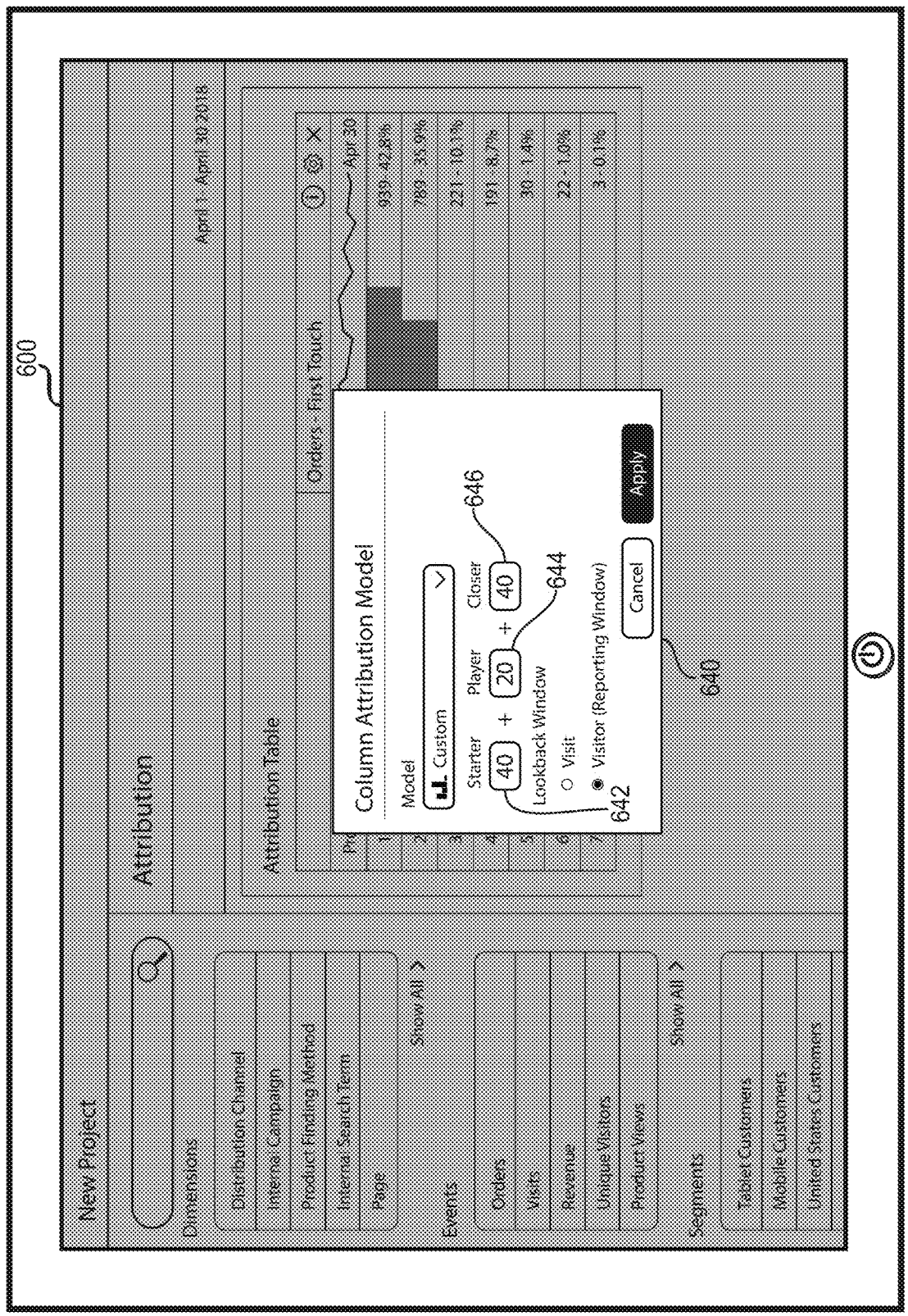

Indeed, upon receiving a selection of the attribution model option 510 or the selectable option enabling the user to modify or change the currently selected attribution model, the query-time attribution system 106 provides a window enabling the administrator to select a new attribution model or modify a currently applied attribution model. FIGS. 6A-6C illustrate the query-time attribution system 106 providing attribution model selection windows that enable an administrator to select or modify attribution models.

For example, FIG. 6A illustrates the query-time attribution system providing a user interface 600 including an the attribution model selection window 602. In particular, the attribution model selection window 602 includes an attribution model selection menu 604, lookback window options 606, a cancel button 608, and an accept button 610. The attribution model selection window 602 enables an administrator to select one of the available attribution models to apply to the user-specified dimension and the user-specified event. As illustrated in FIG. 6A, the attribution model selection menu 604 shows the attribution model that is currently applied (e.g., the default attribution model or the previously selected attribution model). In one or more embodiments, in response to detection of a selection of the attribution model selection menu 604, the query-time attribution system 106 provides a drop-down menu listing all of the available attribution models.

As shown in FIG. 6A, the lookback window options 606 enable a user to select either a visit lookback window or a visitor lookback window. When "visit lookback" is selected, the query-time attribution system 106 applies the selected attribution model to the stored touchpoint data on a per visit basis. When "visitor lookback" is selected, the query-time attribution system 106 applies the selected attribution model to the stored touchpoint data on a visitor basis.

The cancel button 608 allows the administrator to cancel an attribution model selection or modification, causing the query-time attribution system 106 to retain the previous attribution model settings. Selection of the accept button 610 submits a new query that includes the newly selected or modified attribution model. In response, the query-time attribution system 106 applies the newly selected or modified attribution model to the stored touchpoint data as will be discussed in more detail below with reference to FIGS. 8-9. The query-time attribution system 106 then generates a new digital attribution report—reflecting the results of the new query—and provides the new digital attribution report to the client device of the administrator.

FIG. 6B illustrates the query-time attribution system 106 providing an attribution model selection window 620. The attribution model selection window 620 is similar to the attribution model selection window 602 of FIG. 6A but provides additional user-selectable options that correspond to the time-decay attribution model. In particular, the attribution model selection window 620 provides the half-life numeral adjuster 622 and the half-life metric adjuster 628. The query-time attribution system 106 can decrease or increase the numerical value of the half-life used by the half-life attribution model in response to detecting a selection of either the subtract button 624 or the add button 626, respectively. The query-time attribution system can additionally change the metric by which the half-life will be measured in response to detecting input at the half-life metric adjuster 628. For example, the query-time attribution system 106 can use the half-life metric adjuster 628 to define the half-life to be measured in years, months, weeks, days, hours, etc.

FIG. 6C illustrates the query-time attribution system 106 providing another attribution model selection window 640. As seen in FIG. 6C, the attribution model selection window 640 provides user-selectable options that correspond to a custom attribution model. In particular, the attribution model selection window 640 provides a first touch weight window 642, a mid-touch weight window 644, and a last touch weight window 646. By entering or modifying values in each of the weight windows, an administrator can customize the weights applied by the custom attribution model to each of the respective touches. In particular, the custom attribution model applies the value entered into the mid-touch weight window 644 to every applicable touchpoint that is neither a first touchpoint nor a last touchpoint. In one or more embodiments, the attribution model selection window 640 allows an administrator to enter any combination of values in the weight windows (e.g., any combination of values adding up to 100). In response to the selections made in the attribution model selection window 640, the query-time attribution system 106 can generate a new digital attribution report using an attribution model based on the detected selections.

Thus, the query-time attribution system 106 introduces functionality that conventional attribution-modeling systems previously could not perform. In particular, the query-time attribution system 106 can allow for dynamic comparisons of events according to customized (or differing) attribution models. In particular, the query-time attribution system 106 can provide more complex and specific attributions than some of the conventional attribution models available to attribution-modeling systems. Additionally, or alternatively, in some embodiments, the query-time attribution system 106 generates attribution visualizations within the attribution user interface that previous systems could not generate (e.g., a single report generated on the fly comparing differing attribution models).

Figure 7:
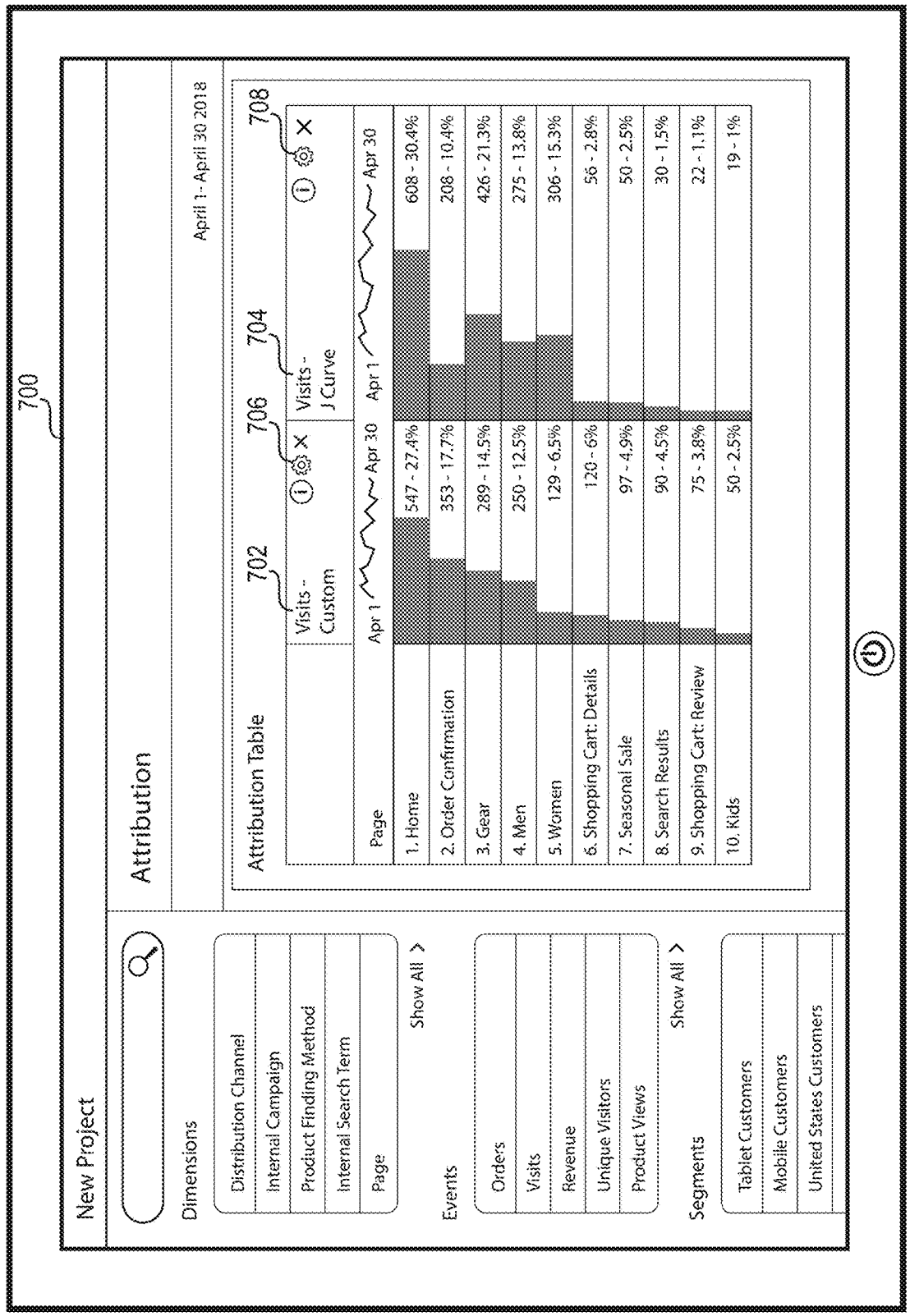
FIG. 7 illustrates a user interface displaying multiple digital attribution reports simultaneously in accordance with one or more embodiments.

In one or more embodiments, the query-time attribution system 106 can generate multiple digital attribution reports in response to multiple queries and provide the multiple digital attribution reports for simultaneous display on a client device (e.g., the administrator device 116). FIG. 7 illustrates the query-time attribution system 106 providing a user interface 700 for displaying multiple digital attribution reports simultaneously. In particular, the user interface 700 includes a first digital attribution report 702 and a second digital attribution report 704. In some embodiments, the user interface 700 can display any number of digital attribution reports simultaneously. In particular, the first and second digital attribution report 702, 704 each display attribution results obtained from applying different attribution models to touchpoint data corresponding to a "page" dimension based on a "Visits" event.

In one or more embodiments, the query-time attribution system 106 receives the first query and the second query simultaneously. In some embodiments, the query-time attribution system 106 receives a query for the second digital attribution report 704 after generating the first digital attribution report 702. For example, in one or more embodiments, the query-time attribution system 106 provides the user interface 700 to display the first digital attribution report 702 in response to receiving a first query. In response to detecting a selection of the first digital attribution report 702 and optionally detecting a dragging motion to the side (e.g., left or right), the query-time attribution system 106 can receive a second query. In response to receiving the second query, the query-time attribution system 106 can generate the second digital attribution report 704 and provide it for display on the user interface 700 simultaneously with the first digital attribution report 702. Subsequently, the query-time attribution system 106 can receive a query including a new user-specified attribution model or attribution model modifications after detecting a selection of the first settings option 706 and/or the second settings option 708. In response, the query-time attribution system 106 can display the new attribution results through the first digital attribution report 702 and/or the second digital attribution report 704, respectively.

As mentioned, the first digital attribution report 702 and the second digital attribution report 704 each show the credit assigned to the same user-specified dimension based on the same event. Indeed, by simultaneously displaying the results of applying different attribution models to subsets of touchpoint data corresponding to the same user-specified dimension based on the same event, the query-time attribution system 106 enables the administrator to compare the performance of a dimension with regards to an event as shown by the different attribution models. For example, the first digital attribution report 702 shows that a custom model attributes about 27% of the visits received in April (e.g., visits to a website) to the "home" dimension value (e.g., the home page of the website). By contrast, the second digital attribution report 704 shows that a J-curve model attributes additional visits to the "home" dimension value. In one or more embodiments, the query-time attribution system 106 defines a different user-specified dimension for the first and second digital attribution report 702, 704 in response to detecting user input. In further embodiments, the query-time attribution system 106 defines a different event for the first and second digital attribution report 702, 704 in response to detecting user input.

Similarly, as shown in FIG. 7, the first digital attribution report 702 and the second digital attribution report 704 each show the results of touchpoint data relevant to the same time window. In one or more embodiments, however, the user interface 700 enables the administrator to define a different time window for the first and second digital attribution report 702, 704.

Figure 8:
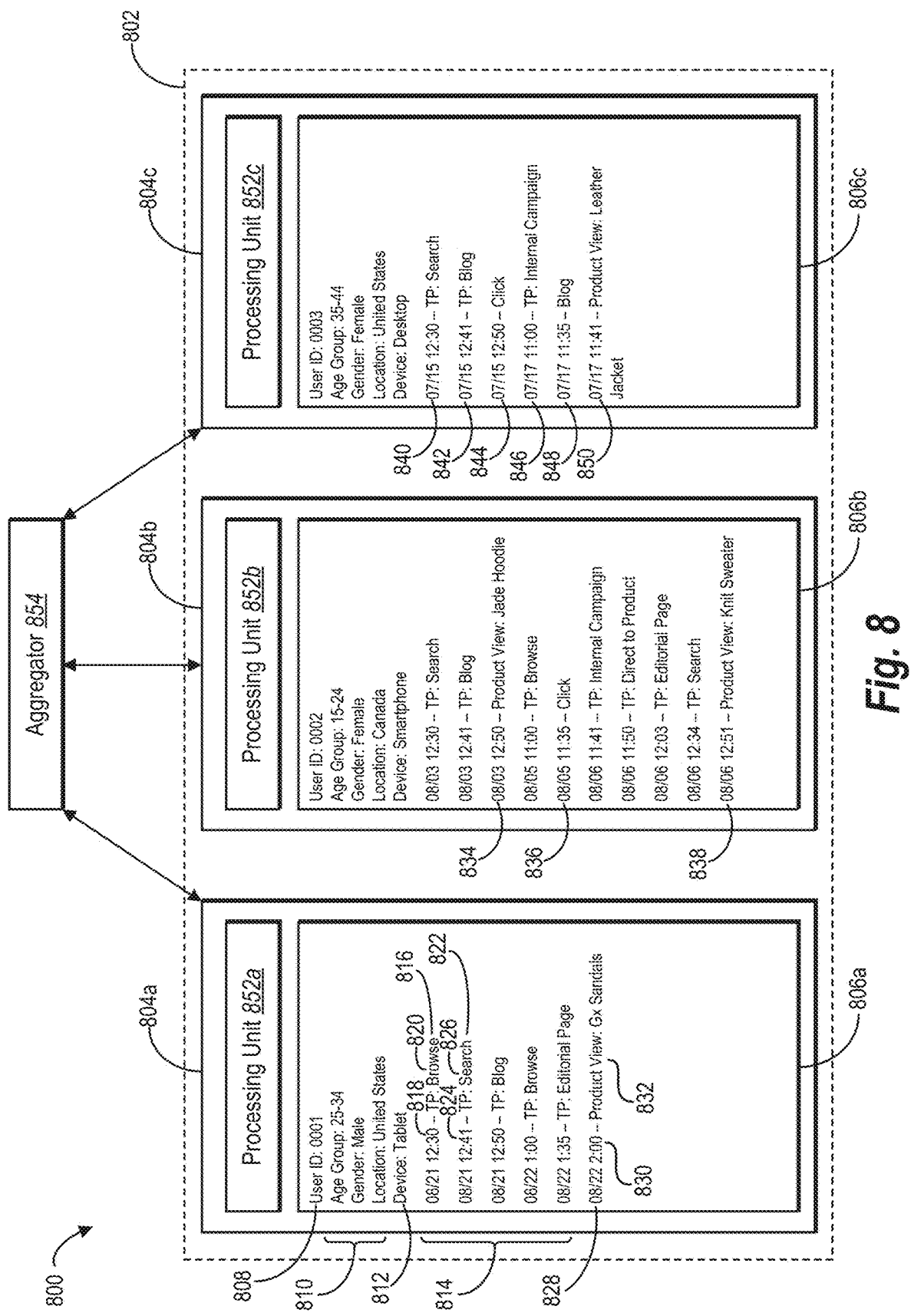
FIGS. 8-9 illustrate schematic representations of architectures of an analytics database in accordance with one or more embodiments.

As mentioned above, the query-time attribution system 106 stores touchpoint data in an analytics database in a manner to allow for fast and efficient query-time attribution modeling. In response to an administrator submitting a query, the query-time attribution system 106 retrieves subsets of touchpoint data relevant to the query from the analytics database to generate the digital attribution report. The architecture of one or more embodiments of the analytics database and its use in storing and retrieving touchpoint data for the generation of digital attribution reports will now be discussed with reference to FIGS. 8-9 below. FIG. 8 illustrates an analytics database 800 used by the query-time attribution system 106 to store and retrieve touchpoint data in accordance with one or more embodiments. As can be seen in FIG. 8, the analytics database 800 includes a plurality of nodes 802 and an aggregator 852.

In particular, the plurality of nodes 802 includes a first node 804a, a second node 804b, and a third node 804c. For simplicity, FIG. 8 illustrates the plurality of nodes 802 including three nodes; however, it should be noted that the plurality of nodes 802 can include any number of nodes. As shown in FIG. 8, each of the nodes 804a-804c corresponds to a different user. Specifically, each of the nodes 804a-804c stores touchpoint data associated with a corresponding user within a data storage unit (e.g., one of the data storage units 806a-806c). For example, the data storage unit of a node can store identification data, user data, device data, touchpoint data, and event data associated with the user corresponding to the node.

To provide an example, the first node 804a includes the data storage unit 806a for storing data associated with a first user. As shown in FIG. 8, the data storage unit 806a includes user ID 808, user data 810, device data 812, touchpoint data 814, and event data 828. The user ID 808 includes an identifier that identifies the first user. For example, FIG. 8 shows the user ID 808 including a numeric identifier assigned to the first user. However, the user ID 808 can include any other identifier appropriate for identifying a user, such as a name of the user or an IP address or cookie associated with the user's device.

The user data 810 includes data characterizing the first user. As shown in FIG. 8, the user data 810 includes data characterizing an age group, a gender, and a location of the first user. It should be noted, however, that the user data 810 can include any data appropriate or useful for characterizing the first user. For example, in one or more embodiments, the user data 810 can include data characterizing the occupation, employer, or level of education of the first user.

The device data 812 includes data characterizing the device used by the first user. As shown in FIG. 8, the device data 812 characterizes the device of the first user as a tablet. The device data 812 can include additional characterizing data as well, such as the brand of the device, the model of the device, or the specs of the device.

The touchpoint data 814 includes instances of touchpoint data associated with the first user. As shown in FIG. 8, a first instance of touchpoint data 816 includes a first timestamp 818 and an associated first indication of a touchpoint 820. In particular, the first instance of touchpoint data 816 shows that the first user engaged in browsing (e.g., browsed a website associated with the administrator) to find a product at the time and date indicated by the first timestamp 818. Similarly, a second instance of touchpoint data 822 includes a second timestamp 824 and an associated second indication of a touchpoint 826, showing that the first user engaged in a search to find a product at the time and date indicated by the second timestamp 824. In one or more embodiments, the instances of touchpoint data additionally can include the sub-channel element corresponding to the touchpoint. For example, the second instance of touchpoint data 822 can include search terms used by the first user in searching for a product associated with the administrator.

In one or more embodiments, the first node 804a stores each instance of touchpoint data included within the touchpoint data 814 chronologically based on the timestamps of each instance. For example, by comparing the first timestamp 818 with the second timestamp 824, the first node 804a can determine that the first user engaged in browsing before performing a search. Consequently, the first node 804a stores the first instance of touchpoint data 816 in a manner that indicates that it chronologically precedes the second instance of touchpoint data 822. By storing the touchpoint data 814 chronologically, the query-time attribution system 106 can quickly determine, at query time, which data is relevant to a submitted query as will be discussed in more detail below.

As mentioned above, the first node 804a additionally stores the event data 828 within the data storage unit 806a. In particular, the event data 828 stored in the first node 804a includes one instance of event data that includes an event timestamp 830 and an indication of an event 832. The event timestamp 830 indicates when an event occurred, and the indication of the event 832 provides detail regarding the event itself. For example, as shown in FIG. 8, the event data 828 indicates that the first user viewed information for a product labeled "GX Sandals" at the time and date indicated by the event timestamp 830. In one or more embodiments, the indication of the event 832 provides additional detail regarding the event (e.g., how long the first user viewed the product). Though the event data 828 provides information regarding a product view by the first user, in one or more embodiments, the first node 804a stores information regarding other events performed by the first user or resulting from actions of the first user (e.g., an application download, a click, a first-time visit, a purchase, etc.).

In one or more embodiments, the first node 804a stores the event data 828 along with the touchpoint data 814 chronologically based on the event timestamp 830. For example, the event timestamp 830 indicates that the first user viewed the information for the "GX Sandals" after every touchpoint represented within the touchpoint data 814. Consequently, the first node 804a stores the event data 828 in a manner that indicates that it follows every instance of the touchpoint data 814. By storing the event data 828 with the touchpoint data 814 chronologically, the first node 804a can quickly determine, at query time, how each instance of the touchpoint data 814 relates to the event as will be discussed in more detail below.

In one or more embodiments, each of the nodes 804a-804c can store multiple instances of events, whether those events are the same types of events or different types of events. In other words, each of the nodes 804a-804c stores all touchpoint data and event data associated with the user corresponding to the particular node. To provide an illustration, the second node 804b stores event data that includes multiple instances of event data within the data storage unit 806b. In particular, the second node 804b stores a first instance of event data 834, a second instance of event data 836, and a third instance of event data 838 where each of the instances of event data 834, 836, and 838 include the same information as the event data 828 stored by the first node 804a. For example, as shown in FIG. 8, the first instance of event data 834 and the third instance of event data 838 each represent a different product view performed by the second user. As mentioned, each of the nodes 804a-804c can store any type of event data as illustrated by the second instance of event data 836, which represents a click performed by the second user. Thus, each of the nodes 804a-804c can store all data associated with a user within its respective data storage unit.

Further, as shown in FIG. 8, each of the nodes 804a-804c further includes a processing unit (e.g., one of the processing units 852a-852c). In one or more embodiments, the processing unit of a node is used to store data in and retrieve data from that node. To provide an example, the third node 804c includes the processing unit 852c. The third node 804c can use the processing unit 852c to store data associated with the third user. For example, as the third node 804c receives touchpoint data and event data associated with the third user, the processing unit 852c can store the data in the data storage unit 806c chronologically based on the timestamp associated with each instance of the data. As shown in FIG. 8, the processing unit 852c stores a first instance of touchpoint data 840, a second instance of touchpoint data 842, a first instance of event data 844, a third instance of touchpoint data 846, a fourth instance of touchpoint data 848, and a second instance of event data 850 chronologically based on the associated timestamps.

Further, as mentioned, the third node 804c can use the processing unit 850c to retrieve data relevant to a query from the data storage unit 806c at query time. For example, the query-time attribution system 106 can submit instructions to the nodes of the analytics database 800 corresponding to a query that includes a user-specified dimension, a user-specified attribution model, and a user-specified event. In response to receiving the instructions, the third node 804c can use the processing unit 850c to retrieve a subset of touchpoint data corresponding to the user-specified dimension in accordance with the user-specified attribution model. In one or more embodiments, the processing unit 850c further retrieves the subset of touchpoint data based on the user-specified event. In one or more embodiments, the processing unit 850c retrieves the subset of touchpoint data by filtering out instances of touchpoint data that do not correspond to the user-specified dimension. The processing unit 850c then analyzes the remaining instances of touchpoint data in accordance with the user-specified attribution model and can further analyze the remaining instances of touchpoint data based on the user-specified event. Consequently, the processing unit 850c identifies one or more touchpoints called for by the user-specified attribution model.

To provide an illustration, the query-time attribution system 106 can receive a query that includes "product finding methods" as the user-specified dimension, "first touch" as the user-specified attribution model, and "product views" as the user-specified event. The third node 804c can receive this request and use the processing unit 850c to retrieve relevant touchpoint data from the data storage unit 806c. In particular, the processing unit 850c filters the touchpoint data stored in the data storage unit 806c to exclude any touchpoint data that does not correspond to a product finding method. The processing unit 850c then analyzes the remaining touchpoint data (i.e., in this case, all instances of touchpoint data shown) to identify the first touchpoint as called for by the first touch attribution model. In particular, because the query specified "product views" as the event, the processing unit 850c identifies the first touchpoint with respect to any product views indicated by either the first instance of event data 844 or the second instance of event data 850. Because only the second instance of event data 850 represents a product view, the processing unit 850c retrieves a subset of touchpoint data that includes the search touchpoint represented by the first instance of touchpoint data 840.

In one or more embodiments, the processing units can further combine instances of touchpoint data retrieved from their respective nodes. In particular, the processing units can combine instances of touchpoint data that are of the same type (i.e., correspond to the same dimension value). For example, if the processing unit 852a retrieved a subset of touchpoint data that included both browse touchpoints and the blog touchpoint in accordance with the user-specified attribution model, the processing unit 852a could combine the two browse touchpoints (i.e., combine the credit attributed to each browse touchpoint in accordance with the applicable attribution model). Consequently, the aggregator 854 is able to combine subsets of touchpoint data that have already been consolidated by each respective node. In other words, the query-time attribution 106 can use the database 800 to perform a two-step process for combining touchpoint data—a first step performed by each node within the plurality of nodes 802 and a second step performed by the aggregator 852 discussed as follows.

As mentioned above, the analytics database 800 further includes the aggregator 854. In one or more embodiments, the query-time attribution system 106, after receiving a query, uses the aggregator 854 to instruct the plurality of nodes 802 to retrieve subsets of touchpoint data relevant to the query. In some embodiments, the aggregator 854 generates instructions based on the query and passes the instructions to the plurality of nodes 802. In some embodiments, the aggregator 854 merely forwards the query onto the plurality of nodes 802.

Additionally, as mentioned, the query-time attribution system 106 uses the aggregator 854 to combine the subsets of touchpoint data retrieved from the plurality of nodes 802. In particular, the aggregator 854 combines touchpoints from the subsets of touchpoint data that correspond to the same dimension value. For example, in response to a query, the aggregator 854 can receive three subsets of touchpoint data from the plurality of nodes 802, each subset of touchpoint data including a browse touchpoint. Subsequently, the aggregator 854 can combine the subsets of touchpoint data to provide an attribution to the browse product finding method that includes a combination of the credit assigned at each node in accordance with the applicable attribution model. After the aggregator 854 combines the subsets of touchpoint data received from the plurality of nodes 802, the query-time attribution system 106 can use the combined subsets of touchpoint data to generate a digital attribution report.

Figure 9:
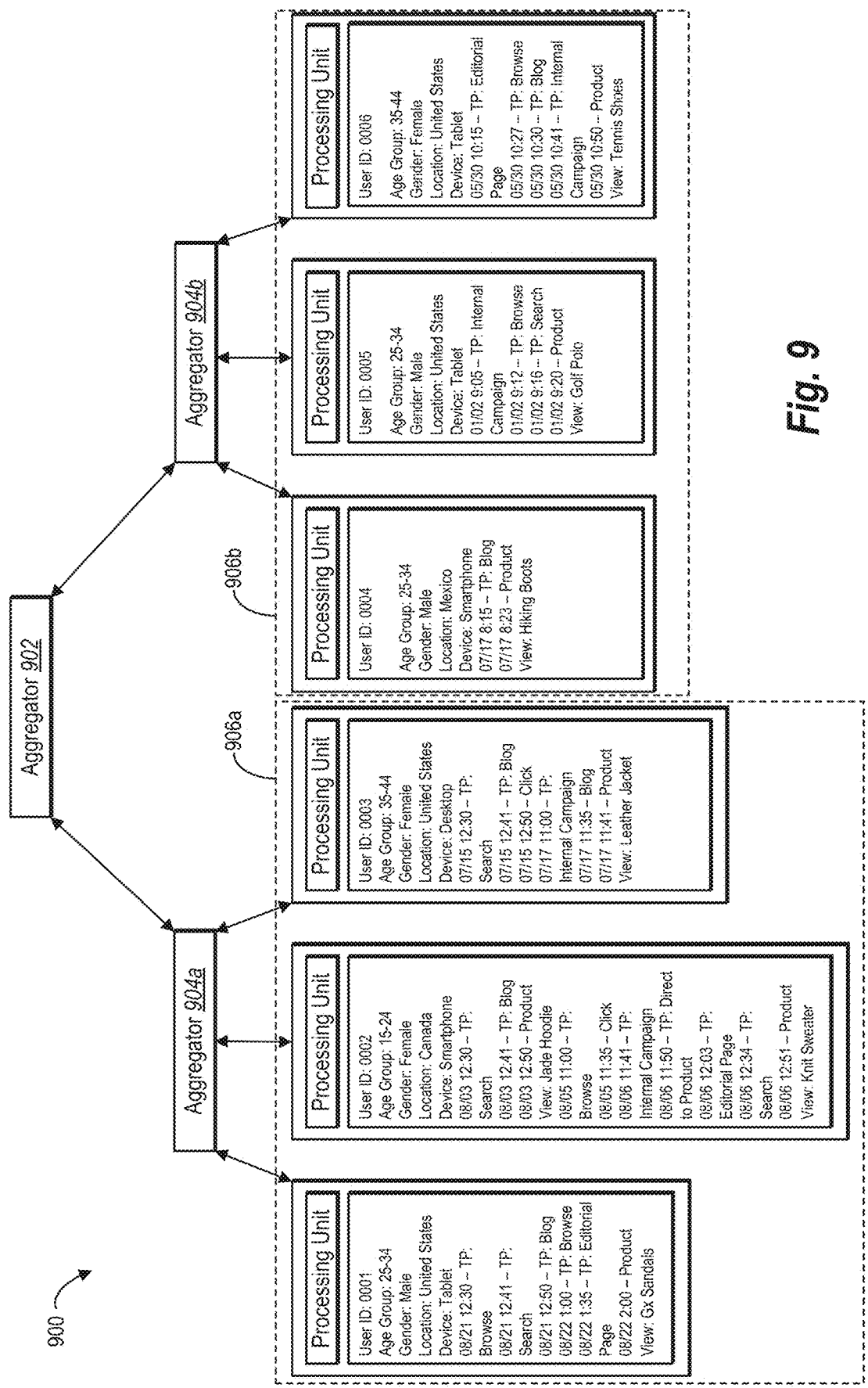

In one or more embodiments, the analytics database further includes a plurality of intermediate aggregators. FIG. 9 illustrates an analytics database 900 that includes a plurality of intermediate aggregators in accordance with one or more embodiments. In particular, the analytics database 900 includes a master aggregator 902, a first intermediate aggregator 904a, a second intermediate aggregator 904b, a first subset of nodes 906a, and a second subset of nodes 906b. As seen in FIG. 9, the first subset of nodes 906a corresponds to the first intermediate aggregator 904a and the second subset of nodes 906b corresponds to the second intermediate aggregator 904b. In one or more embodiments, the analytics database 900 includes any number of intermediate aggregators and corresponding subsets of nodes.

In one or more embodiments, the combination of intermediate aggregator and the corresponding subset of nodes operates similar to analytics database 800 of FIG. 8. For example, the first subset of nodes 906a uses the user-specified attribution model included in a query to identify first subsets of touchpoint data corresponding to the user-specified dimension based on the user-specified event. The first intermediate aggregator 904a then combines data from the first subsets of touchpoint data to generate a first set of aggregated touchpoint data. Similarly, the second subset of nodes 906b uses the user-specified attribution model to identify second subsets of touchpoint data corresponding to the user-specified dimension based on the user-specified event, and the second intermediate aggregator 904b combines data from the second subsets to generate a second set of aggregated touchpoint data.

The master aggregator 902 combines data from the first and second intermediate aggregator 904a, 904b. For example, as shown in FIG. 9, the master aggregator 902 can combine the first set of aggregated touchpoint data received from the first intermediate aggregator 904a and the second set of aggregated touchpoint data received from the second intermediate aggregator 904b. The query-time attribution system 106 can then use the combined sets of aggregated touchpoint data to generate a digital attribution report.

As shown above, the structure of the backend (e.g., analytics database 800) of the query-time attribution system 106 allows for on demand, query-time attribution modeling with in a fast and efficient manner. The structure of the backend (e.g., analytics database 800) of the query-time attribution system 106 allows for fast and efficient query-time attribution modeling. In particular, by storing touchpoint data for a single user in each node, the query-time attribution system eliminates the need for node cross-talk and ensures that each node can essentially instantaneously (e.g., in milliseconds) retrieve and forward to an aggregator the data applicable to an attribution query. The aggregator can then combine the applicable data so as to build an attribution report. Thus, despite having to processes large numbers of data, the structure of the query-time attribution system allows for fast and flexible query-time attribution modeling.

Thus, the query-time attribution system 106 stores touchpoint data in an analytics database. Additionally, the query-time attribution system 106 can use the touchpoint data, as stored in the analytics database, to generate digital attribution reports in real time in response to receiving a query. In particular, the query-time attribution system 106 can use the touchpoint data, as stored in the analytics database to generate digital attribution reports for user-specified dimensions. The algorithms and acts described in reference to FIGS. 8-9 can comprise the corresponding structure for performing a step for storing touchpoint data in an analytics database in a manner that supports query-time analytics dimension modeling. Additionally, the analytics database architecture described in relation to FIGS. 8-9 can comprise the corresponding structure for performing a step for storing touchpoint data in an analytics database in a manner that supports query-time analytics dimension modeling.

Further, the query-time attribution system 106 retrieves and combines touchpoint data in response to receiving a query. Additionally, the query-time attribution system 106 can use the combined data to generate a digital attribution report in response to a query and can further generate digital attribution reports for segments of touchpoint data. Thus, the algorithms and acts described with reference to FIGS. 3-9 can comprise the corresponding structure for performing, in real time in response to the query, a step for generating the digital attribution report for the user-specified dimension using the attribution model based on touchpoint data stored in the analytics database. Additionally, the analytics database architecture described in relation to FIGS. 3-9 can comprise the corresponding structure for performing, in real time in response to the query, a step for generating the digital attribution report for the user-specified dimension using the attribution model based on touchpoint data stored in the analytics database.

Figure 10:
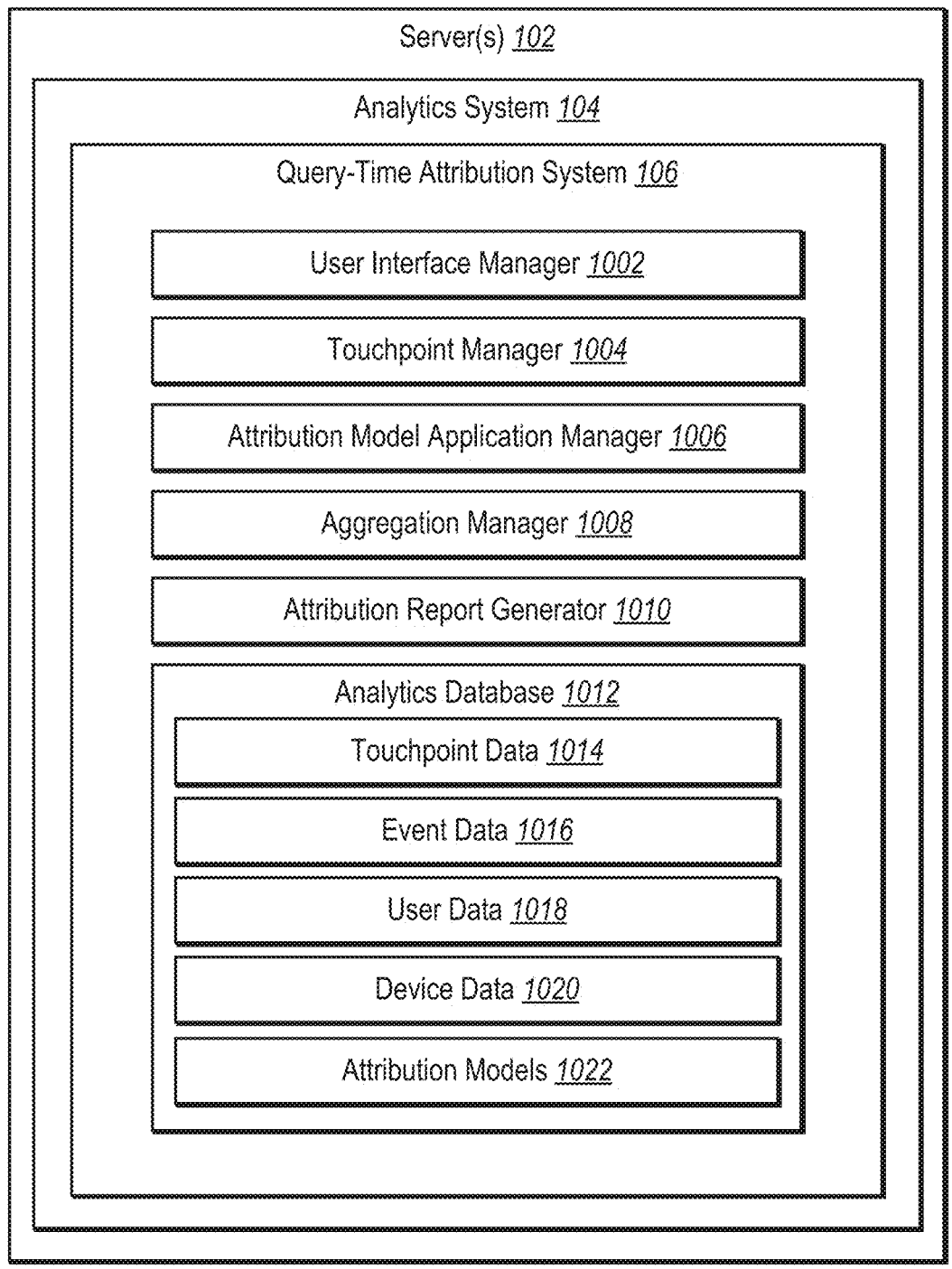
FIG. 10 illustrates an example schematic diagram of a query-time attribution system in accordance with one or more embodiments.

FIG. 10 illustrates a detailed schematic diagram of an example architecture of the query-time attribution system 106. As shown, the query-time attribution system can be part of the server(s) 102 and the analytics system 104. Additionally, the query-time attribution system 106 can include, but is not limited to, a user interface manager 1002, a touchpoint manager 1004, an attribution model application manager 1006, an aggregation manager 1008, an attribution report generator 1010, and data storage 1012 (which includes touchpoint data 1014, event data 1016, user data 1018, device data 1020, and attribution models 1022).

As just mentioned, and as illustrated in FIG. 10, the query-time attribution system 106 includes the user interface manager 1002. In particular, the user interface manager 1002 provides, to a client device associated with an administrator, a user interface through which the administrator can submit a query for a digital attribution report. For example, the user interface manager 1002 can provide options for selecting a dimension, an event, an attribution model, and or a segment. Additionally, the user interface manager 1002 provides, through the user interface, one or more digital attribution reports generated by the attribution report generator 1010 in response to the query.

As shown in FIG. 10, the query-time attribution system 106 also includes the touchpoint manager 1004. In particular, the touchpoint manager 1004 can track touchpoints associated with a given user and store the corresponding touchpoint data in touchpoint data 1014. For example, the touchpoint manager 1004 can communicate with a third-party network server (e.g., the third-party network server 122) to determine when a touchpoint has occurred (e.g., when an email has been received or when a search has been performed).

Additionally, as shown in FIG. 10, the query-time attribution system 106 includes the attribution model application manager 1006. In particular, each node of the analytics database includes an instance of the attribution model application manager 1006 (e.g., stored in the processing unit). The attribution model application manager 1006 retrieves data relevant to a query received through the user interface manager 1002. For example, the attribution model application manager 1006 of a given node can retrieve a subset of touchpoint data corresponding to the user-specified dimension in accordance with the user-specified attribution model and based on a user-specified event. The attribution model application manager 1006 further combines multiple instances of touchpoint data, when applicable.

Further, as shown in FIG. 10, the query-time attribution system 106 includes the aggregation manager 1008. In particular, the aggregator (or each intermediate aggregator) of the analytics database includes an instance of the aggregation manager 1008. The aggregation manager 1008 combines subsets of touchpoint data received from the instances of the attribution model application manager 1006 (or combines sets of aggregated touchpoint data received from instances of the aggregation manager 1008 corresponding to intermediate aggregators).

Additionally, as shown in FIG. 10, the query-time attribution system 106 includes the attribution report generator 1010. In particular, the attribution report generator 1010 generates digital attribution reports using subsets of touchpoint data combined by the aggregation manager 1008. The attribution report generator 1010 can then send the digital attribution reports to the user interface manager 1002 for display through a user interface.

Further, as shown in FIG. 10, the query-time attribution system 106 includes data storage 1012. In particular, data storage 1012 includes touchpoint data 1014, event data 1016, user data 1018, device data 1020, and attribution models 1022. Each node of the analytics database includes an instance of touchpoint data 1014, event data 1016, user data 1018, and device data 1020. Touchpoint data 1014 stores instances of touchpoint data associated with a particular user. An instance of the attribution model application manager 1006 retrieves instances of touchpoint data from a corresponding instance of touchpoint data 1014. Event data 1016 stores instances of event data (e.g., including any products associated with a particular event). User data 1018 stores data describing a user (e.g., age, gender, location, etc.) including the user ID. Device data 1020 stores data regarding a device used by the user (e.g., device type, model, specs, etc.). Attribution models 1022 stores the attribution models the query-time attribution system 106 can apply. For example, attribution models 1022 can store instructions, that get passed to the attribution model application manager 1006, on how to apply the particular attribution model after an administrator has submitted a query.

Each of the components 1002-1022 of the query-time attribution system 106 can include software, hardware, or both. For example, the components 1002-1022 can include one or more instructions stored on a non-transitory computer readable storage medium and executable by processors of one or more computing devices, such as a client device or server device. When executed by the one or more processors, the computer-executable instructions of the query-time attribution system 106 can cause the computing device(s) to perform the methods described herein. Alternatively, the components 1002-1022 can include hardware, such as a special-purpose processing device to perform a certain function or group of functions. Additionally, or alternatively, the components 1002-1022 of the query-time attribution system 106 can include a combination of computer-executable instructions and hardware.

Furthermore, the components 1002-1022 of the query-time attribution system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1002-1022 of the query-time attribution system 106 may be implemented as a stand-alone application, such as a desktop or mobile application. Furthermore, the components 1002-1022 of the query-time attribution system 106 may be implemented as one or more web-based applications hosted on a remote server. Alternatively, or additionally, the components 1002-1022 of the query-time attribution system 106 may be implemented in a suite of mobile device applications or "apps." For example, in one or more embodiments, the query-time attribution system 106 can comprise or operate in connection with digital software applications such as ADOBE® ANALYTICS CLOUD® or ADOBE® MARKETING CLOUD®. "ADOBE," "ANALYTICS CLOUD," and "MARKETING CLOUD" are either registered trademarks or trademarks of Adobe Inc. in the United States and/or other countries.

Figure 11:
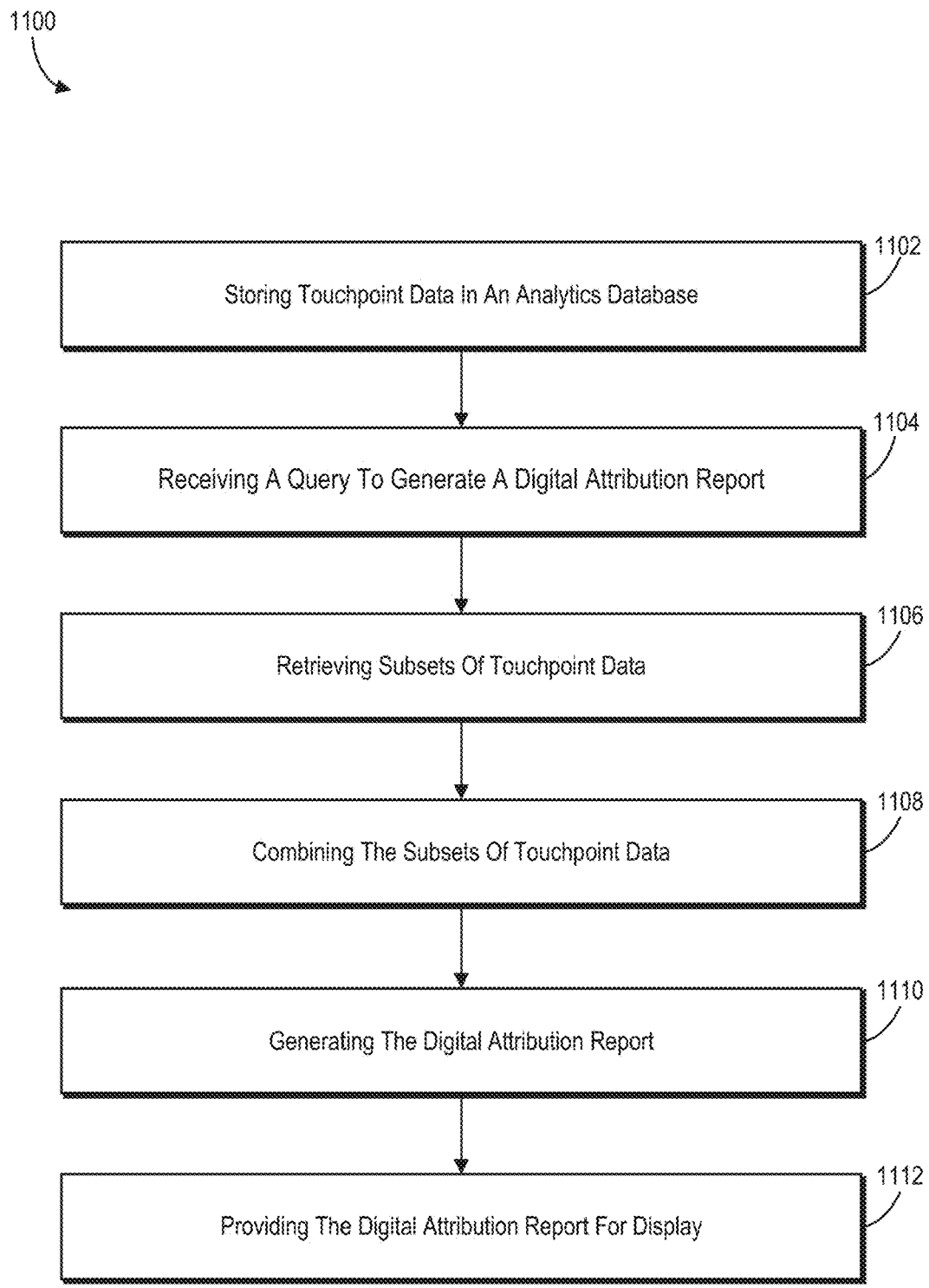
FIG. 11 illustrates a flowchart of a series of acts of generating digital attribution reports in real time in response to receiving a query in accordance with one or more embodiments.

FIGS. 1-10, the corresponding text, and the examples provide a number of different methods, systems, devices, and non-transitory computer readable media of the query-time attribution system 106. In addition to the foregoing, one or more embodiments can also be described in terms of flowcharts comprising acts for accomplishing a particular result, as shown in FIG. 11. FIG. 11 may be performed with more or fewer acts. Further, the acts may be performed in differing orders. Additionally, the acts described herein may be repeated or performed in parallel with one another or parallel with different instances of the same or similar acts.

As mentioned, FIG. 11 illustrates a series of acts 1100 for generating digital attribution reports in real time in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. For example, in some embodiments, the acts of FIG. 11 can be performed as part of a method in a digital medium environment for collecting and analyzing analytics data about network communications. Alternatively, a non-transitory computer-readable medium can comprise instructions that, when executed by at least one processor, cause a computing device to perform the acts of FIG. 11. In some embodiments, a system can perform the acts of FIG. 11. For example, in one or more embodiments, a system includes a memory component comprising of an aggregator and a plurality of nodes, wherein each node is configured to chronologically store touchpoint data associated with a corresponding user. Further, the system comprises at least one server and at least one non-transitory computer readable storage medium comprising instructions that, when executed by the at least one server, cause the system to perform the acts of FIG. 11.

The series of acts 1100 includes an act 1102 of storing touchpoint data in an analytics database. For example, the act 1102 involves storing touchpoint data in an analytics database comprising an aggregator and a plurality of nodes, wherein each node corresponds to a given user and stores touchpoint data associated with the given user. In one or more embodiments, the touchpoint data comprises one or more touchpoints and a timestamp associated with each of the one or more touchpoints. Specifically, in some embodiments, an instance of touchpoint data comprises an indication of a touchpoint and a timestamp associated with the touchpoint. Consequently, in some embodiments, storing the touchpoint data in the analytics database comprises storing, in each node, instances of touchpoint data chronologically based on the timestamp associated with each touchpoint of a corresponding user.

In one or more embodiments, the analytics database further comprises a plurality of intermediate aggregators, wherein each intermediate aggregator is associated with, and aggregates data from, a different subset of the nodes of the plurality of nodes. For example, the analytics database can comprise a first intermediate aggregator corresponding to a first subset of nodes and a second intermediate aggregator corresponding to a second subset of nodes.

The series of acts 1100 also includes an act 1104 of receiving a query to generate a digital attribution report. For example, the act 1104 involves receiving a query to generate a digital attribution report for a user-specified dimension based on an attribution model. In one or more embodiments, the user-specified dimension comprises a dimension other than distribution channels. For example, in one or more embodiments, the user-specified dimension comprises at least one of internal campaigns, product finding methods, internal search terms, pages, page types, products, product types, or product brands.

Further, in one or more embodiments, the attribution model comprises a user-specified attribution model. For example, the attribution model can include a custom attribution model comprising a user-specified set of weights to be applied to the subsets of touchpoint data corresponding to the user-specified dimension. As another example, the attribution model can include a time decay attribution model comprising a user-specified half-life to be applied to the subsets of touchpoint data corresponding to the user-specified dimension.

The series of acts 1100 further includes an act 1106 of retrieving subsets of touchpoint data. For example, the act 1106 involves, in response to receiving the query and in real time, retrieving, using the nodes of the plurality of nodes, subsets of touchpoint data corresponding to the user-specified dimension in accordance with the attribution model. In one or more embodiments, retrieving the subsets of touchpoint data comprises filtering, at each node, a subset of touchpoints for the corresponding user that correspond to the user-specified dimension in accordance with the attribution model.

In some embodiments, retrieving the subsets of touchpoint data comprises sending, to the plurality of nodes, a request for touchpoint data corresponding to the user-specified dimension based on the attribution model; and using the attribution model, at the plurality of nodes, to identify subsets of touchpoint data corresponding to the user-specified dimension to send to the aggregator. In one or more embodiments, using the user-specified attribution model, at the plurality of nodes, to identify subsets of touchpoint data comprises filtering, at each node, a subset of touchpoints for the corresponding user that correspond to the user-specified dimension in accordance with the attribution model. In some embodiments, filtering, at each node, the subset of touchpoints comprises filtering, at each node, to exclude instances of touchpoint data that do not correspond to the user-specified dimension and analyzing instances of touchpoint data remaining after the filtering in accordance with the attribution model. In further embodiments, analyzing the instances of touchpoint data remaining after the filtering comprises identifying one or more touchpoints called for by the attribution model.

Where the analytics database further comprises a plurality of intermediate aggregators, using the attribution model, at the plurality of nodes, to identify subsets of touchpoint data comprises using the attribution model, at the first subset of nodes, to identify a first subsets of touchpoint data corresponding to the user-specified dimension and using the attribution model, at the second subset of nodes, to identify a second subsets of touchpoint data corresponding to the user-specified dimension.

In one or more embodiments, the query to generate the digital attribution report for the user-specified dimension based on the attribution model comprises a user-specified event. Consequently, the subsets of touchpoint data corresponding to the user-specified dimension retrieved in accordance with the attribution model comprise one or more touchpoints called for by the attribution model based on the user-specified event. The user-specified event can be an event other than orders or revenue. For example, the user-specified event comprises one of custom events, units, visits, cart additions, or cart removals.

Additionally, the series of acts 1100 includes an act 1108 of combining the subsets of touchpoint data. For example, the act 1108 involves, in response to receiving the query and in real time, combining, using the aggregator, the subsets of touchpoint data corresponding to the user-specified dimension in accordance with the attribution model. In some embodiments, the act 1108 involves, in response to receiving the query and in real time, combining, at the aggregator, the subsets of touchpoint data corresponding to the user-specified dimension from the plurality of nodes.

Where the analytics database further comprises a plurality of intermediate aggregators, the series of acts 1100 can further include an act for aggregating, using each intermediate aggregator, the subsets of touchpoint data from the subset of nodes corresponding to each intermediate aggregator to generate sets of aggregated touchpoint data (not shown). Consequently, combining, using the aggregator, the subsets of touchpoint data comprises combining the sets of aggregated touchpoint data from the plurality of intermediate aggregators. To illustrate, where the analytics database further comprises a first and second intermediate aggregator, the series of acts 1100 further includes aggregating, using the first intermediate aggregator, data from the first subsets of touchpoint data corresponding to the user-specified dimension to generate a first set of aggregated touchpoint data; and aggregating, using the second intermediate aggregator, data from the second subsets of touchpoint data corresponding to the user-specified dimension to generate a second set of aggregated touchpoint data. Consequently, combining, at the aggregator, the subsets of touchpoint data corresponding to the user-specified dimension from the plurality of nodes comprises combining the first set of aggregated touchpoint data and the second set of aggregated touchpoint data.

Further, the series of acts 1100 includes an act 1110 of generating the digital attribution report. For example, the act 1110 involves, in response to receiving the query and in real time, generating the digital attribution report using the combined subsets of touchpoint data (or the combined sets of aggregated touchpoint data).

The series of acts 1100 also includes an act 1112 of providing the digital attribution report for display. For example, the act 1112 involves, in response to receiving the query and in real time, providing the digital attribution report for display (i.e., display on a user interface of an administrator device).

In one or more embodiments, the series of acts 1100 further includes acts for generating a second digital attribution report in response to receiving a second query. For example, in one or more embodiments, the query-time attribution system 106 receives a second query to generate a second digital attribution report for the user-specified dimension based on a second attribution model. In response to receiving the second query, and in real time, the query-time attribution system 106 can retrieve, using the nodes of the plurality of nodes, second subsets of touchpoint data corresponding to the user-specified dimension in accordance with the second attribution model; combine, using the aggregator, the second subsets of touchpoint data corresponding to the user-specified dimension in accordance with the second attribution model; and generate the second digital attribution report using the combined second subsets of touchpoint data. Subsequently, the query-time attribution system 106 can provide the second digital attribution report for display simultaneously with the (first) digital attribution report.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
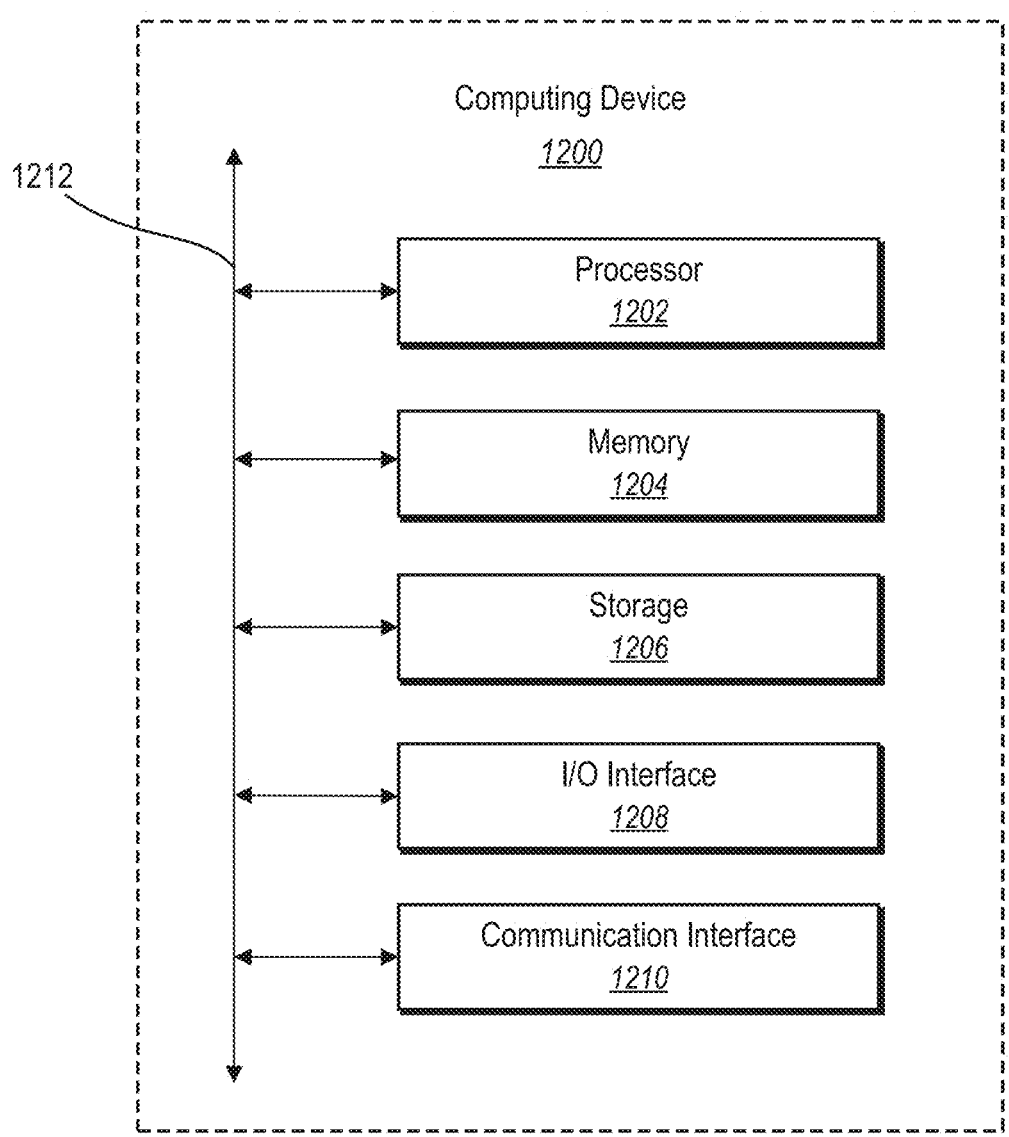
FIG. 12 illustrates a block diagram of an exemplary computing device in accordance with one or more embodiments.

FIG. 12 illustrates a block diagram of an example computing device 1200 that may be configured to perform one or more of the processes described above. One will appreciate that one or more computing devices, such as the computing device 1200 may represent the computing devices described above (e.g., the server(s) 102, client devices 110*a*-110*n*, and the administrator device 116). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for collecting and analyzing analytics data about network communications, a method for generating digital attribution reports in real time comprising:
    storing data that is received from a plurality of client devices associated with a plurality of users in an analytics database comprising an aggregator and a plurality of nodes, wherein each node corresponds to a given user and storing the data within a node comprises utilizing a processing unit of the node to store a user ID and touchpoint data associated with the given user within a data storage unit of the node;
    receiving a query to generate a digital attribution report for a user-specified dimension based on an attribution model; and
    in response to receiving the query and in real time:
        retrieving, using nodes of the plurality of nodes, subsets of touchpoint data corresponding to the user-specified dimension in accordance with the attribution model;
        combining, using the aggregator, the subsets of touchpoint data corresponding to the user-specified dimension in accordance with the attribution model;
        generating the digital attribution report using the combined subsets of touchpoint data; and
        providing the digital attribution report for display.

2. The method of claim 1, wherein the user-specified dimension comprises a dimension other than distribution channels.

3. The method of claim 2, wherein the user-specified dimension comprises at least one of internal campaigns, product finding methods, internal search terms, pages, page types, products, product types, or product brands.

4. The method of claim 1, wherein the attribution model comprises a user-specified attribution model.

5. A non-transitory computer readable storage medium comprising instructions that, when executed by at least one processor, cause a computing device to:
   store data that is received from a plurality of client devices associated with a plurality of users in an analytics database comprising an aggregator and a plurality of nodes, wherein each node corresponds to a given user and storing the data within a node comprises utilizing a processing unit of the node to store a user ID and touchpoint data associated with the given user within a data storage unit of the node;
   receive a query to generate a digital attribution report for a user-specified dimension based on an attribution model; and
   in response to receiving the query and in real time:
      retrieve, using nodes of the plurality of nodes, subsets of touchpoint data corresponding to the user-specified dimension in accordance with the attribution model;
      combine, using the aggregator, the subsets of touchpoint data corresponding to the user-specified dimension in accordance with the attribution model;
      generate the digital attribution report using the combined subsets of touchpoint data; and
      provide the digital attribution report for display.

6. The non-transitory computer readable storage medium of claim 5, wherein:
   the query to generate the digital attribution report for the user-specified dimension based on the attribution model comprises a user-specified event, and
   the subsets of touchpoint data corresponding to the user-specified dimension retrieved in accordance with the attribution model comprise one or more touchpoints called for by the attribution model based on the user-specified event.

7. The non-transitory computer readable storage medium of claim 6, wherein: the user-specified event is an event other than orders or revenue.

8. The non-transitory computer readable storage medium of claim 7, wherein: the user-specified event comprises one of custom events, units, visits, cart additions, or cart removals.

9. The non-transitory computer readable storage medium of claim 5, wherein:
   an instance of touchpoint data comprises an indication of a touchpoint and a timestamp associated with the touchpoint, and
   the instructions, when executed by the at least one processor, cause the computing device to store the touchpoint data in the analytics database by storing, in each node, instances of touchpoint data chronologically based on the timestamp associated with each touchpoint of a corresponding user.

10. The non-transitory computer readable storage medium of claim 5, wherein the instructions, when executed by the at least one processor, cause the computing device to, retrieve, using the nodes of the plurality of nodes, the subsets of touchpoint data corresponding to the user-specified dimension in accordance with the attribution model by filtering, at each node, a subset of touchpoints for a corresponding user that correspond to the user-specified dimension in accordance with the attribution model.

11. The non-transitory computer readable storage medium of claim 5, wherein the analytics database further comprises a plurality of intermediate aggregators, wherein each intermediate aggregator is associated with, and aggregates data from, a different subset of nodes of the plurality of nodes.

12. The non-transitory computer readable storage medium of claim 11,
   further comprising instructions that, when executed by the at least one processor, cause the computing device to aggregate, using each intermediate aggregator, the subsets of touchpoint data from the subset of nodes corresponding to each intermediate aggregator to generate sets of aggregated touchpoint data,
   wherein the instructions, when executed by the at least one processor, cause the computing device to combine, using the aggregator, the subsets of touchpoint data by combining the sets of aggregated touchpoint data from the plurality of intermediate aggregators.

13. The non-transitory computer readable storage medium of claim 5, further comprising instructions that, when executed by the at least one processor, cause the computing device to:
   receive a second query to generate a second digital attribution report for the user-specified dimension based on a second attribution model;
   in response to receiving the second query and in real time:
      retrieve, using the nodes of the plurality of nodes, second subsets of touchpoint data corresponding to the user-specified dimension in accordance with the second attribution model;
      combine, using the aggregator, the second subsets of touchpoint data corresponding to the user-specified dimension in accordance with the second attribution model; and
      generate the second digital attribution report using the combined second subsets of touchpoint data; and
   provide the second digital attribution report for display simultaneously with the digital attribution report.

14. A system comprising:
   a memory component comprising an analytics database that stores data received from a plurality of client devices associated with a plurality of users, the analytics database comprising:
      an aggregator; and
      a plurality of nodes, wherein each node comprises a data storage unit and a processing unit that chronologically stores touchpoint data associated with a corresponding user within the data storage unit and stores a user ID of the corresponding user within the data storage unit;
   at least one server; and
   at least one non-transitory computer readable storage medium comprising instructions that, when executed by the at least one server, cause the system to:
      receive a query to generate a digital attribution report for a user-specified dimension based on an attribution model; and
      in response to receiving the query and in real time:
         send, to the plurality of nodes, a request for touchpoint data corresponding to the user-specified dimension based on the attribution model;
         use the attribution model, at the plurality of nodes, to identify subsets of touchpoint data corresponding to the user-specified dimension to send to the aggregator;
         combine, at the aggregator, the subsets of touchpoint data corresponding to the user-specified dimension from the plurality of nodes;
         generate the digital attribution report based on the combined subsets of touchpoint data; and
         provide the digital attribution report for display on a client device.

15. The system of claim 14,
wherein an instance of touchpoint data comprises an indication of a touchpoint and a timestamp associated with the touchpoint, and
further comprising instructions that, when executed by the at least one server, cause the system to store, in each node, instances of touchpoint data chronologically based on the timestamp associated with each touchpoint of the corresponding user.

16. The system of claim 14, wherein the instructions, when executed by the at least one server, cause the system to use the attribution model, at the plurality of nodes, to identify subsets of touchpoint data corresponding to the user-specified dimension to send to the aggregator by filtering, at each node, a subset of touchpoints for the corresponding user that correspond to the user-specified dimension in accordance with the attribution model.

17. The system of claim 16, wherein filtering, at each node, the subset of touchpoints for the corresponding user that correspond to the user-specified dimension in accordance with the attribution model comprises:
filtering, at each node, to exclude instances of touchpoint data that do not correspond to the user-specified dimension; and
analyzing instances of touchpoint data remaining after the filtering in accordance with the attribution model.

18. The system of claim 14, wherein:
the memory component further comprises:
a first intermediate aggregator corresponding to a first subset of nodes; and
a second intermediate aggregator corresponding to a second subset of nodes, and
the instructions, when executed by the at least one server, cause the system to use the attribution model, at the plurality of nodes, to identify the subsets of touchpoint data corresponding to the user-specified dimension to send to the aggregator by:
using the attribution model, at the first subset of nodes, to identify a first subsets of touchpoint data corresponding to the user-specified dimension; and
using the attribution model, at the second subset of nodes, to identify a second subsets of touchpoint data corresponding to the user-specified dimension.

19. The system of claim 18,
further comprising instructions that, when executed by the at least one server, cause the system to:
aggregate, using the first intermediate aggregator, data from the first subsets of touchpoint data corresponding to the user-specified dimension to generate a first set of aggregated touchpoint data; and
aggregate, using the second intermediate aggregator, data from the second subsets of touchpoint data corresponding to the user-specified dimension to generate a second set of aggregated touchpoint data,
wherein the instructions, when executed by the at least server, cause the system to combine, at the aggregator, the subsets of touchpoint data corresponding to the user-specified dimension from the plurality of nodes by combining the first set of aggregated touchpoint data and the second set of aggregated touchpoint data.

20. The non-transitory computer readable storage medium of claim 5, wherein utilizing the processing unit of the node to store the user ID associated with the given user within the data storage unit of the node comprises utilizing the processing unit of the node to store at least one of a name of the given user or an IP address or cookie associated with a client device of the given user.

* * * * *